United States Patent
Yamada

(10) Patent No.: US 7,774,088 B2
(45) Date of Patent: Aug. 10, 2010

(54) NUMERIC CONTROL APPARATUS AND NUMERIC CONTROL MACHINE CONTROLLING A NUMBER OF SYSTEMS

(75) Inventor: Yoshinori Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 11/720,587

(22) PCT Filed: Dec. 26, 2005

(86) PCT No.: PCT/JP2005/023742

§ 371 (c)(1),
(2), (4) Date: May 31, 2007

(87) PCT Pub. No.: WO2007/074501

PCT Pub. Date: Jul. 5, 2007

(65) Prior Publication Data

US 2009/0182438 A1 Jul. 16, 2009

(51) Int. Cl.
*G06F 19/00* (2006.01)
*G05B 11/01* (2006.01)
*G05B 19/18* (2006.01)

(52) U.S. Cl. ............ 700/169; 700/20; 700/61; 700/170; 700/188; 700/189

(58) Field of Classification Search ............ 700/61, 700/159, 169–170, 188–189, 19–20
See application file for complete search history.

(56) References Cited

U.S. PATENT DOCUMENTS

| | | | | |
|---|---|---|---|---|
| 4,998,206 A | * | 3/1991 | Jones et al. | 700/96 |
| 5,453,933 A | * | 9/1995 | Wright et al. | 700/181 |
| 5,914,876 A | * | 6/1999 | Hirai | 700/87 |
| 6,290,571 B1 | * | 9/2001 | Dilger et al. | 451/5 |
| 6,400,998 B1 | * | 6/2002 | Yamazaki et al. | 700/86 |
| 6,404,160 B2 | * | 6/2002 | Sagasaki et al. | 318/600 |
| 6,427,098 B1 | * | 7/2002 | Alverson et al. | 700/245 |
| 6,909,939 B1 | * | 6/2005 | Yamada | 700/189 |
| 7,127,322 B2 | * | 10/2006 | Kreidler et al. | 700/169 |
| 2005/0043849 A1 | * | 2/2005 | Coleman et al. | 700/195 |
| 2005/0197723 A1 | * | 9/2005 | Harada et al. | 700/85 |
| 2006/0283292 A1 | * | 12/2006 | Iwabuchi et al. | 82/1.11 |
| 2007/0112468 A1 | * | 5/2007 | Freeman | 700/265 |

FOREIGN PATENT DOCUMENTS

| | | |
|---|---|---|
| JP | 63-054603 A | 3/1988 |
| JP | 01-150909 A | 6/1989 |
| JP | 03-028908 A | 2/1991 |
| JP | 2004-299049 A | 10/2004 |

* cited by examiner

*Primary Examiner*—Ramesh B Patel
(74) *Attorney, Agent, or Firm*—Sughrue Mion, PLLC

(57) ABSTRACT

Irrespective of operation mode of systems in which predetermined axes belong to, a multi-system numerical controller is provided that freely combines axes belonging to arbitrary systems, and then simultaneously operates axes belonging to a plurality of systems in a predetermined manual mode, or simultaneously operates a plurality of axes belonging to the same system in respective manual operation modes so as to safely take interpolation control in manual operation. The numerical control apparatus includes a plurality of manual operation controllers and independent of the systems; a manual-operation-mode selecting signal provided each for the manual operation controllers; an arbitrary-axis selection signal, provided each for the manual operation controllers or manual modes, for selecting axes from any of the systems; a manual-move-speed instructing signal provided each for the manual operation controller; a manual operation reset signal provided each for the manual operation controllers.

20 Claims, 11 Drawing Sheets

SYSTEM 1 : X1,Z1,C1
SYSTEM 2 : X2,Z2

SYSTEM 1 : X1,Z1,C1
SYSTEM 2 : X2,Z2,C2,V2
SYSTEM 3 : X3,Z3
SYSTEM 4 : A1,A2,A3

SYSTEM 1 : X1,Z1,C1
SYSTEM 2 : X2,Z2,C2,V2

NUMERIC CONTROL APPARATUS AND NUMERIC CONTROL MACHINE CONTROLLING A NUMBER OF SYSTEMS

TECHNICAL FIELD

The present invention relates to numerical control apparatus and numerical control machine tools provided with a numerical control apparatus, especially relates to taking control of feed shaft in manual operation, of a multi-system numerical control apparatus that can control two or more systems.

BACKGROUND ART

A conventional single-system numerical control apparatus is configured to have a plurality of control axes being controlled by a machining program and various kind of control signals, as to machine one single product or a plurality of identical products.

When an operator operates the operation board provided with a display to input signals into the apparatus, the apparatus selects, by the inputted signals, an operation mode from either an automatic operation mode such as a memorized operation mode or an MDI (manual data input) operation mode, or a manual operation mode such as a jog-move mode, a handle-move mode, an incremental-move mode, a manual arbitrary move mode, or a return-to-referential-position mode, and performs operation in each of the operation modes with predetermined control signals to operate the modes being inputted (for example, when in the jog-move mode, an axis selection signal and a manual-move-speed-specifying signal).

Here, the automatic operation means to automatically operate a numerical control machine tool with an NC machining program; the manual operation means that an operator manually operates the numerical control machine tool by operating manual handles and various kinds of buttons provided on the mechanical operation board.

Moreover, the memorized operation mode in the automatic operation means that when a startup button is pushed, an NC machining program that has been stored in advance in a memory is read out from the memory and then the automatic operation of the numerical control machine tool is performed according to the NC machining program. The MDI operation means that the automatic operation is performed according to an NC machining program that has been inputted from an MDI keyboard into a CNC.

The jog-move mode in the manual operation mode means a move mode in which, when an operator pushes a manual move button, a designated control axis is moved at a predetermined speed; the handle-move mode means a move mode in which the operator moves a designated control axis by rotating a manual handle generate instruction pulses; the incremental-move mode means a move mode in which a control axis is moved by a predetermined quantity every time the operator pushes a pushbutton; the manual arbitrary move mode means a move mode in which a designated control axis is moved to a predetermined position when the operator pushes a startup button; the return-to-referential-position mode means a move mode in which a designated control axis is moved to a reference position when the operator pushes a return-to-referential-position button.

In contrast to the above, a multi-system numerical control apparatus is provided with a plurality of control system sets such as described above, and they are implemented within a unit of hardware; each of the systems is controlled by independent machining programs and control signals, so that the apparatus can machine one or a plurality of identical/different products, by the plurality of the control systems (refer to Patent document 1, for example).

For example, in a two-system numerical control apparatus, as illustrated in FIG. 11, the apparatus is configured to include a PLC controller 20, a first-system controller 71 that controls a first system, a second-system controller 72 that controls a second system, Axis Controller 3, and Axis Controller 4 through 11 and 12 through 19.

Here, the first-system controller 71 and the second-system controller 72 include operational mode selectors 71A and 72A, respectively, for selecting either manual operation mode or automatic operation mode, manual operation controllers 71B and 72B, respectively, for taking control of manual operations according to a manual operation mode selected for each, and automatic operation controllers 71J and 72J, respectively, for automatically controlling according to an automatic operation mode selected for each.

Moreover, the manual operation controllers 71B and 72B include, for each of the systems, jog-move controllers 71C and 72C; handle-move controllers 71D and 72D; incremental move controllers 71E and 72E; manual arbitrary move controllers 71F and 72F; return-to-referential-position controllers 71G and 72G; and manual operation interpolation controllers 71H and 72H, respectively.

Also, the automatic operation controllers 71J and 72J include, for each of the systems, memorized operation controllers 71K and 72K; MDI operation controllers 71L and 72L; analytic processors 71M and 72M that perform analysis of machining programs 73 and 74, for each of the systems, being read thereinto; and automatic operation interpolation controllers 71N and 72N, respectively.

The operator operates an operation board provided with display so as to input from the PLC controller 20 into the first-system controller 71 and the second-system controller 72 signals including a signal for selecting either a manual operation mode or an automatic operation mode, a signal for selecting either the memorized operation mode or the MDI operation mode in automatic operation mode, and signals in manual operation mode such as a manual-operation-mode selecting signal, an arbitrary-axis selection signal, a manual-move-speed instructing signal, a manual operation reset signal, a move-magnification factor signal, axial move data, and a manual-arbitrary-move modal signal. Thereby, according to the mode that has been selected for each of the systems, the specific axes allocated to each of the systems are operated independently of each other of the systems, either in an automatic mode such as the memorized mode or the MDI mode, or a manual mode such as the jog-move mode, the handle move mode, the incremental move mode, the manual arbitrary move mode, or the return-to-referential-position mode. Interpolation controllers 71H, 71N, 72H, and 72N of each of the systems output shift quantity by which each axis is moved, and that is outputted, via Axis Controller 3, to a predetermined controller among Axis Controller 4 through 11 and 12 through 19.

An NC-reset signal 75 is inputted into the first system controller 71 from the PLC controller 20, and an NC-reset signal 76 is inputted into the second system controller 72 from the PLC controller 20. Here, the NC-reset signal 75 to the first system controller 71 and the NC-reset signal 76 to the second system controller 72 are independent of each other; therefore, the NC-reset signal 75 outputted into the first system controller 71 does not affect the second system controller 72, and the NC-reset signal outputted into the first system controller 72 does not affect the second system controller 71 either.

When the conventional multi-system numerical control apparatus runs machining programs for a plurality of systems at one time, the apparatus can combine predetermined axes so as to perform machining operation, while exchanging axes among the systems such that arbitrary control axis can be instructed from a machining program of any system (refer to Patent document 1, for example).

In case of a multi-system numerical control machine tool illustrated in FIG. 12, for example, a system 1 is configured with a first axis of Axis X1, a second axis of Axis Z1, and a third axis of Axis C1; and a system 2 is configured with first axis of Axis X2, a second axis of Axis Z2, a third axis of Axis C2, and a fourth axis of Axis V2. Axis X1 and Axis Z1 move a first tool slide 51, Axis X2 and Axis Z2 move a second tool slide 52. Also, Axis C1 rotates a first spindle 54, and Axis C2 rotates a second spindle 55. Axis V2 moves the second spindle 55 in Z-directions. Here, in FIG. 12, numerals '56' and '57' indicate workpieces.

Usually, the system 1 performs machining operation with a combination of the first tool slide 51 and the first spindle 54, and the system 2 performs with a combination of the second tool slide 52 and the second spindle 55; however, machining operation may sometimes be performed with a combination of the first tool slide 51 and the second spindle 55, or with a combination of the second tool slide 52 and the first spindle 54. In that case, by instructions for exchanging axes from the programs, Axis C1 for the system 1 and Axis C2 for the system 2, for example, are exchanged for each other so that automatic operation can be performed by configuring the system 1 with Axis X1, Axis Z1, and Axis C2, and the system 2, with Axis X2, Axis Z2, Axis C1, and Axis V2. Or otherwise, Axis X1 and Axis Z1 for the system are exchanged for Axis X2 and Axis Z2 for the system 2 so that automatic operation can be performed by configuring the system 1 with Axis X2, Axis Z2, and Axis C1, and the system 2, with Axis X1, Axis Z1, Axis C2, and Axis V2.

Patent Documentation 1

Japanese Patent Laid-Open No. 1991-28908 (FIG. 1, FIG. 4)

DISCLOSURE OF INVENTION

A conventional multi-system numerical control apparatus, as described above performs, according to a mode selected for each of the systems, operations of predetermined axes allocated to each of the systems, independently of the systems, in an automatic operation mode including a memorized operation and an MDI-operation, or in a manual operation including a jog-move operation, a handle-move operation, an incremental move operation, an arbitrary manual move operation, and a return-to-referential-position operation. In particular, in terms of the manual operation, signals that include a manual-operation-mode selecting signal, an axis selection signal in a system, a manual-move-speed specifying signal, a reset signal, and control signals for each of manual operation modes are allocated to each of the systems; a manual operation mode out of those operation modes is selected for each of the systems according to statuses of the above signals; then predetermined axes, being allocated in advance to the system, that are selected by the axis selection signal are manually operated according to control signals on a manual operation mode basis.

Consequently, since selection of operation modes and selection of axes to be manually operated are performed independently of each of the systems, it has not been possible to perform manual operation with an axis, of other systems, selected.

Furthermore, in cases of the conventional multi-system numerical control machine tool whose axis configuration is illustrated in FIG. 12, when Axis X1 is moved by manual operation, the conventional multi-system numerical control apparatus inputs an axis selection signal, for example, for selecting the first axis of the system 1 to which Axis X1 has been allocated in advance; however, when Axis X1 and Axis X2 have been exchanged for each other between the systems by axial exchange instructions, Axis X1 being re-allocated from the system 1 to the system 2, manual operation of Axis X1 can not operated even by selecting the first axis of the system 1. As has been described, a problem has been that manual operation may not be possible in some cases, depending on statuses whether the axes have been exchanged by program instructions.

Furthermore, since the conventional multi-system numerical control apparatus performs automatic operation or manual operation independently of each other of the systems, a problem has been that the apparatus can not manually operate simultaneously a plurality of axes that have been allocated to different systems. Therefore even when the same manual operation mode is selected for a plurality of systems and axis selection is made to instruct to manually operate the axes allocated to different systems simultaneously, manual operations are performed in each system independently; therefore, it is impossible to securely and simultaneously begin shift operations. Also even when such an error such as an overmove arises in any one of the axes, only the system to which the error axis belongs error-halts; the manual operations in other systems, continue independently; therefore, halt-instructions for other systems sometimes may not be issued safely to halt them simultaneously and securely.

Furthermore the conventional numerical control apparatus selects, on a system basis, either an automatic operation mode including a memorized mode and an MDI operation mode, or a manual operation mode including a jog-move operation, handle-move operation, an incremental move operation, an arbitrary manual move operation, and a return-to-referential-position operation, and operates by inputting predetermined signals to perform each operation mode; therefore, when axes need to be manually operated independently of other axes, as is the case with peripheral axes that drive peripheral devices of a machine tool (tool exchangers, for example), each of the axes has needed to be allocated to each system by itself, independently of each other. In this case, a sophisticated multi-system numerical control apparatus is needed that can control, in addition to the systems that perform machining, numbers of peripheral axes simultaneously, causing a problem in that the apparatus becomes expensive.

Furthermore, the conventional numerical control apparatus can perform manual operation, in a manual arbitrary move mode, that can take interpolation control of a plurality of axes in a system so as to place the axes in their referential positions; therefore, for example, after automatic operation has been error-halted, by selecting one or a plurality of axes allocated to each of the systems and taking interpolation control of them, they can be manually moved safely to predetermined positions as well as in predetermined directions. On the other hand, since the conventional multi-system numerical control apparatus can perform machining operation in a combination of predetermined axes with axes being exchanged by a machining program, among the systems, when the apparatus has been error-halted during machining operations in a state in which axes have been exchanged among the systems, manual interpolation needs to be performed using a plurality of axes of different systems, depending on the axis configuration of the machine tool and on the condition when halted, so that return operation can be performed. However, because the apparatus performs manual arbitrary move on a system basis, it is impossible to combine a plurality of axes of different systems with each other, and perform manual interpolation to arbitrary positions; therefore, a problem has been that manual-return operations can not be performed safely.

In a case of a multi-system numerical control machine tool, for example, that is configured with axes as illustrated in FIG. 9, when the machine tool has been error-halted during machining with a configuration with Axis X1, Axis Z1, and Axis C1; because Axis X1, Axis Z1, and Axis C1 are allocated in the same system, they can be returned; however, when a machining program has exchanged Axis X1 of a system 1 for Axis X2 of a system 2, and then the machine tool has halted during automatic operation with Axis X2, Axis Z1, and Axis C1, a tool that has bitten into the workpiece needs to be moved back with Axis X2 and Axis Z1 being interpolation-controlled. In this case, because Axis X2 and Axis Z1 are allocated to the different systems, in this configuration, the tool can not be manually interpolation-controlled in a direction to be returned; therefore, recovery from such incidents has been difficult.

Furthermore, since the conventional numerical control apparatus has outputted from the PLC controller 20 only NC-reset signals (numeral of '75' or '76', in the figure) to the systems, a problem has been that, when other axes (belonging to the automatically operated system) not in automatic operation are manually operated during the automatic operation, if an NC-reset signal is outputted to the system, the axes of an automatically operating system are all reset. For example, in the first system including three axes of Axis X, Axis Y, and Axis Z, while Axis X and Axis Y are in automatic operation and Axis Z, in manual operation, if the NC-reset signal 75 is inputted into the first system controller 71, all of Axis X, Axis Y, and Axis Z are reset; therefore, even though it is required that only automatically operating Axis X and Axis Y be reset, manually operating Axis Z has also been reset.

The present invention is aimed to solve problems described above, and to provide a numerical control apparatus that can manually operate required axes in a predetermined manual operation mode, irrespective of axis configuration of each of the systems, so as to ensure high degree of freedom in operation.

Furthermore, the present invention aims to provide numerical control apparatus ensuring high degree of freedom that desired axes can be manually operated in a predetermined manual operation mode, irrespective of the axis exchange status among automatically operating systems.

Furthermore, the present invention aims to provide a numerical control apparatus that can manually operate a plurality of axes while simultaneously selecting those from different systems and simultaneously taking interpolation control of the selected axes.

Furthermore, the present invention aims to provide at low cost a numerical control apparatus that can simultaneously perform a plurality of manual operations with a small number of systems, combining a plurality of axes.

Furthermore, the present invention aims to provide a numerical control apparatus in which, even when an automatically operating system is reset during an automatic operation, the apparatus can operate peripheral tool-axes and the like in an auxiliary manner being unaffected by that incident, in a manual operation mode.

A numerical control apparatus according to the present invention, in a multi-system numerical control apparatus for controlling a plurality of systems, includes: a plurality of automatic operation controllers each of which is provided for each of the systems and operates automatically control axes for each of the systems; and a manual operation controller for manually operating, irrespective of the systems, any of the axes for any of the systems controlled by the automatic operation controllers.

Furthermore, the manual operation controller takes interpolation control of any of the axes for any of the systems.

Furthermore, the manual operation controller includes: a manual operation mode selector for selecting, on the basis of a manual-operation-mode selecting signal, an operation mode such as a jog-move mode, a handle-move mode, an incremental-move mode, a manual arbitrary move mode, or a return-to-referential-position mode; a manual operation mode controller for performing control with the manual operation mode selected by the manual operation mode selector, on the basis of an arbitrary-axis selection signal specifying, as an axis to be manually operated, any one of the axes for the systems, and predetermined signals specifying operating conditions including move speed; and a manual operation interpolation controller for taking interpolation control of the axes manually operated by the manual operation mode controller.

Furthermore, the manual operation controller further includes a manual operation axis selector for determining whether or not the axes selected by the manual operation controller can be manually operated.

Furthermore, the manual operation axis selector determines whether or not the selected axes can manually be operated, based on automatic operation status of the systems that the selected axes belong to and on moving status of the axes.

Furthermore, a numerical control apparatus according to the present invention, in a multi-system numerical control apparatus for controlling a plurality of systems, includes: a PLC controller; a plurality of automatic operation controllers provided for respective systems, for automatically operating, on the basis of signals from the PLC controller, control axes for each of the systems; a plurality of manual operation controllers controlled on the basis of signals from the PLC controller, for manually operating, irrespective of the systems, the axes for the systems controlled by the automatic operation controllers; a manual operation axis selector for determining whether or not axes selected through the manual operation controllers can manually be operated; and an axis controller for controlling the axes that the manual operation axis selector determines to be capable of being manually operated, and the manual operation controller includes a manual operation mode selector for selecting, on the basis of a manual-operation-mode selecting signal outputted from the PLC controller, an operation mode such as a jog-move mode, a handle-move mode, an incremental-move mode, a manual arbitrary move mode, or a return-to-referential-position mode; a manual operation mode controller for performing control with the manual operation mode, selected by the manual operation mode selector, based on an arbitrary-axis selection signal, outputted from the PLC controller, specifying as an axis to be manually operated, any one of the axes for the systems, and on predetermined signals, outputted from the PLC controller, specifying operating conditions including move speed; and a manual operation interpolation controller for taking interpolation control of the axes manually operated by the manual operation mode controller.

Furthermore, the manual operation axis selector determines whether the axes that have been selected by the manual operation controllers can manually be operated, based on whether each of the axes is not instructed simultaneously from any of the manual operation controllers, on automatic operation statuses of the systems that the instructed axes belong to, and on moving statuses of the axes.

Furthermore, the arbitrary-axis selection signal includes an axis specifying signal for specifying one of axial numbers that are allocated uniquely to all of the controllable axes for the systems, and an axis selection signal for determining whether or not an axis specified by the axis specifying signal is valid.

Furthermore, the numerical control apparatus further includes a manual operation reset signal for each of the manual operation controllers aside from an NC-reset signal for each of the systems.

Furthermore, a numerical control machine tool according to the present invention includes a spindle, a plurality of tool slides, and the numerical control apparatus.

According to the present invention, a numerical control apparatus can be provided in which the apparatus can manually operate, irrespective of axis configuration of each of the systems, desired axes in a predetermined manual operation mode so as to attain a high flexibility.

Furthermore, the present invention aims to provide a numerical control apparatus that can manually operate desired axes in a predetermined manual operation mode so as to attain flexibility, irrespective of axis status in which axes are exchanged among manually operated systems.

Furthermore, according to the present invention, the apparatus can manually operate a plurality of axes selected simultaneously from different systems, as simultaneously taking interpolation control of the selected axes.

Therefore, for example, when a machine tool that performs machining as its axes being exchanged among systems, alarm-halts during machining with its axes having been exchanged among the systems, recovery from the halt position can easily be made by selecting axes to be instructed to operate manually, in the combination of axis configurations at the instant of the alarm halt.

Also, for example, when any of the axes, being instructed to manually operate, has error-halted, other axes which have been interpolation-controlled in the same manual operation can halt simultaneously, so that manual operations thereafter can be performed safely.

Also according to the present invention, because the apparatus determines whether or not the selected axes can be manually operated, manual operations thereafter can be performed safely without damages to the machine tool.

Also, according to the present invention, the apparatus can perform interpolation by manual operation, irrespective of axis configuration for each of the systems and status of axes being exchanged among manually operated systems, while freely selecting axes belonging to arbitrary systems from any one of the manual operation controllers, and combining a plurality of axes of the arbitrary system.

Therefore, for example, because a plurality of axes that belongs to the same system is selected from respective different manual operation controllers, the axes can be manually operated in each manual operation mode.

Also, for example, because axes that are operated in different manual operations can be allocated to the same system, the number of controllable systems in an apparatus can be reduced; therefore the numerical control apparatus does not need high-performance CPUs, leading to low cost manufacturing.

Also according to the present invention, when peripheral axes for a machine tool are operated in a manual operation mode, in an auxiliary manner, manual operation can be continued without halting even when an NC-reset signal is inputted due to a reset instruction issued by a program. In contrast, only the peripheral tool axes that are being operated in manual operation modes can be halted without halting the programs that are performing automatic operations.

BEST MODE FOR CARRYING OUT THE INVENTION

Embodiment 1

An embodiment according to the present invention will be explained below, using FIG. 1 through FIG. 10.

Figure 1:
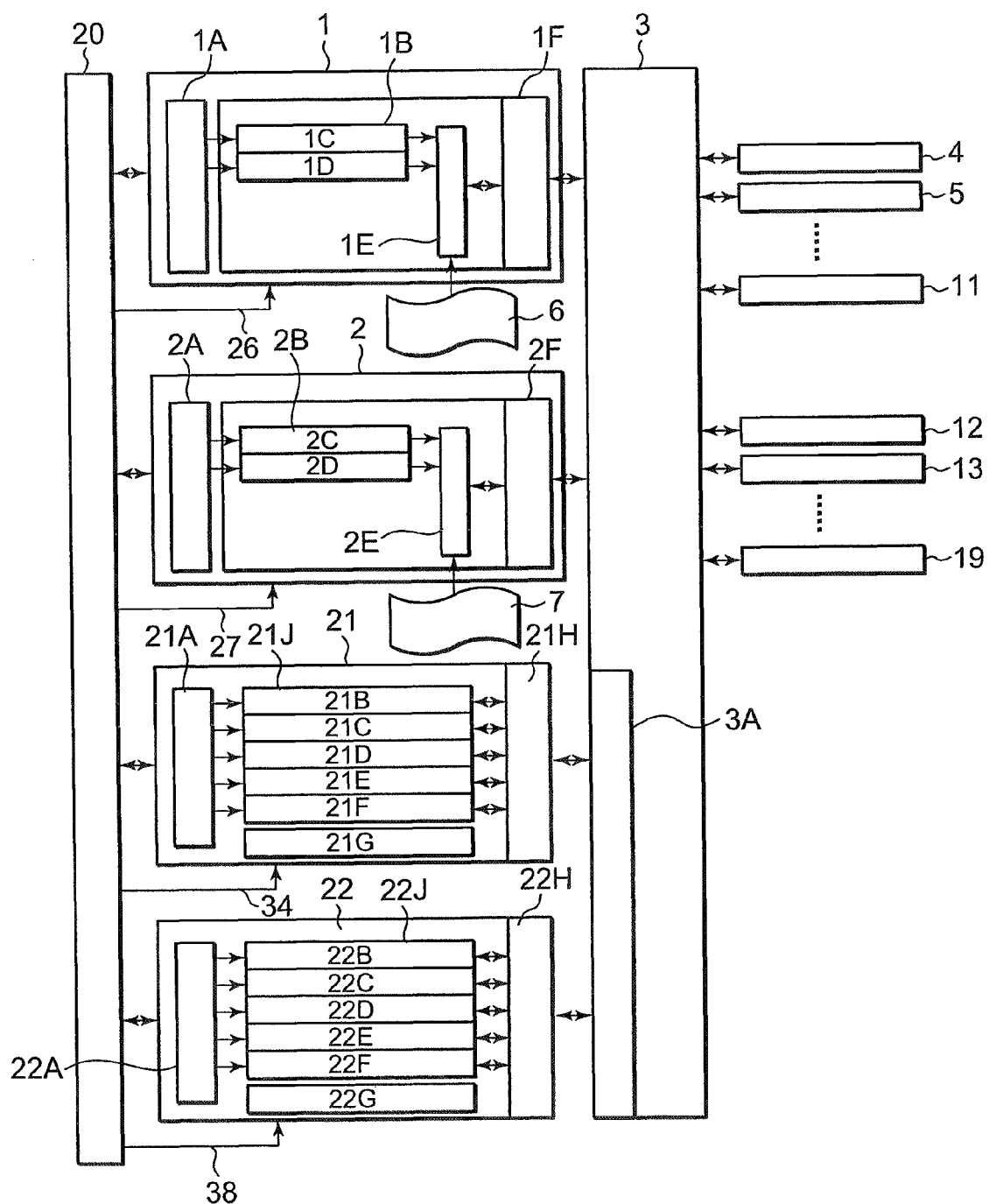
FIG. 1 is a block diagram illustrating essential parts of a numerical control apparatus in an embodiment according to the present invention.

FIG. 1 is a block diagram illustrating essential parts of a numerical control apparatus of the embodiment according to the present invention; the figure shows that the numerical control apparatus is applied to a two-system control apparatus as an example.

As shown, in the figure, the numerical control apparatus includes a first-system controller 1; a second system controller 2; Axis Controller 3; Axis Controllers 4 through 19 for each axis that is allocated to each of the systems; a first manual operation controller 21 that is independent of the first-system, controller 1 and the second-system controller 2; a second manual operation controller 22 that is independent of the first-system controller 1 and the second-system controller 2; a manual operation axis selector 3A; and a PLC controller 20.

Here, controllers such as the system controller 1, the system controller 2, Axis Controller 3, the first manual operation controller 21, the second manual operation controller 22, and the manual operation axis selector 3A are mainly configured with software.

Also, the system controllers are provided in accordance with the number of systems of the numerical control apparatus. For example, when a numerical control apparatus has three systems, three system controllers are provided; when four systems, four system controllers. Also, manual operation controllers are not needed as many as the number of systems of the numerical control apparatus; but the controllers are provided in accordance with the number of systems that need to be manually operated independently and simultaneously.

The first system controller 1 and the second system controller 2 include automatic operation mode selectors 1A and 2A, controlling units 1B and 2B, for each automatic operation mode, that include memorized operation controllers 1C and 2C, and MDI operation controllers 1D and 2D, analytic processors 1E and 2E that read and analyze designated machining programs 6 and 7, and automatic operation interpolation controllers 1F and 2F, respectively.

The first manual operation controller 21 and the second manual operation controller 22 can be controlled independently of each other, and are composed of manual operation mode selectors 21A and 22A, control units 21J and 22J, for each manual operation mode, that include jog-move controllers 21B and 22B, handle-move controllers 21C and 22C, incremental move controllers 21D and 22D, manual arbitrary move controllers 21E and 22E, and return-to-referential-position controllers 21F and 22F, manual operation interpolation controllers 21H and 22H, and arbitrary-axis selector 21G and 22G, respectively.

The manual operation mode selectors 21A and 22A and the arbitrary-axis selectors 21G and 22G will be explained later in detail, using FIG. 3 and FIGS. 5 through 6, respectively.

The operations of the System controller 1, the system controller 2, the first manual operation controller 21, and the second manual operation controller 22 are determined by signals inputted/outputted from the PLC controller 20.

In automatic operation, the first system controller 1 and the second system controller 2 perform automatic operation similarly to conventional numerical control apparatus. That is, automatic operation is performed according to an automatic operation mode selected by each of the automatic operation mode selectors 1A and 2A, as follows: activating respective controlling unit 1B and 2B, for each automatic operation mode, including memorized operation controllers 1C and 2C and MDI operation controllers 1D and 2D; reading block by block the machining programs 6 and 7 that have been searched for in each of the systems and analyzing the programs in analytic processors 1E and 2E; taking interpolation control of the selected axes by interpolation controllers 1F and 2F.

In automatic operation, the first manual operation controller 21 and the second manual operation controller 22 operate to perform manual operation. That is, manual operation is performed according to a manual operation mode selected by each of the manual operation mode selectors 21A and 22A as follows: activating controlling units 21J and 22J, for each manual operation mode, that include jog-feed controllers 21B and 22B, handle-feed controllers 21C and 22C, and the like, respectively; interpolation-controlling, by manual operation interpolation controllers 21H and 22H, independently of automatic operations for each of the systems, the axes that have been selected for controlling units for each manual operation modes, so as to perform the manual operation.

The manual operation axis selector 3A determines whether or not the axes selected by the first manual operation controller 21 and the second manual operation controller 22 coincide with each other, and whether or not the axes selected by the first manual operation controller 21 and the second manual operation controller 22 coincide with those instructed to move by the first system controller 1 and the second system controller 2, and issues an error message if the axes coincide with selected ones. The manual operation axis selector 3A will be explained later in detail using FIG. 7 and FIG. 8.

According to instructions issued by automatic operations of the first system controller 1 and the second system controller 2 or by manual operations of the first manual operation controller 21 and the second manual operation controller 22, Axis Controller 3 outputs interpolated-moving quantities into Axis Controller 4 through 19 that correspond to the instructed axes so that instructed axes can be properly driven.

Numeral 26 denotes a reset signal for the first system controller 1; numeral 27, a reset signal for the second system controller 2; numeral 34, a reset signal for the first manual operation controller 21; numeral 38, a reset signal for the second manual operation controller 22; each of these reset signals is outputted from the PLC controller 20. In addition to the above, these signals are independent of each other; even when the reset signal 26 for the first system controller 1 is inputted, for example, only the first system controller 1 is reset, and the second system controller 2, the first manual operation controller 21, and the second manual operation controller 22 are never reset; also, even when the reset signal 34 for the first manual operation controller 21 is inputted, only the first manual operation controller 21 is reset, and the first system controller 1, the second system controller 2, and the second manual operation controller 22 are never reset.

Figure 2:
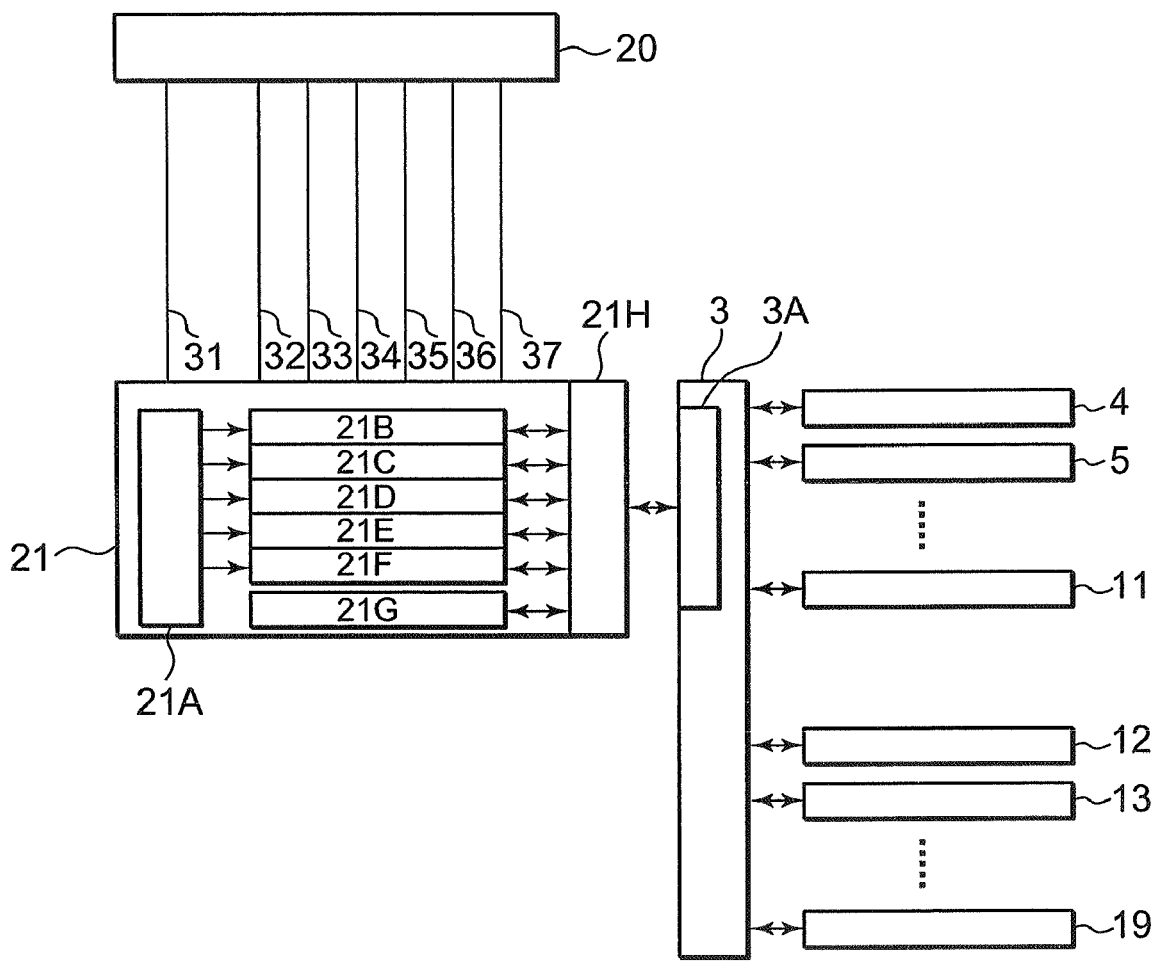
FIG. 2 is a block diagram illustrating essential parts of a manual operation controller of the numerical control apparatus in the embodiment according to the present invention.

FIG. 2 is an example of a detailed block diagram illustrating the peripheral of numerical control apparatus in the embodiment according to the present invention, with the first manual operation controller 21 centered on the diagram. The detailed block diagram of the second manual operation controller 22 peripheral becomes a similar configurational diagram, and the operations of the second manual operation controller 22 also becomes similar to those of the first manual operation controller 21.

When an operator operates an operation board provided with a display, the PLC controller 20 inputs, as illustrated in the diagram, into the first manual operation controller 21 a manual-operation-mode selecting signal 31 for selecting one of manual operation modes including a jog-move mode, a handle-move mode, an incremental-move mode, a manual arbitrary move mode, and a return-to-referential-position mode; an arbitrary-axis selection signal 32 for designating any axis for the systems as an axis to be manually operated; a manual-move-speed instructing signal 33 for specifying the speed of manual move; and the manual operation reset signal 34 that resets the manual operation controller. Furthermore, when the handle-move mode or the incremental-move mode out of the manual operation modes is selected, a move-magnification factor signal 35 is inputted additionally; when the manual arbitrary move mode is selected, axial move data 36 and a manual-arbitrary-move modal signal 37 are inputted additionally.

the signals to be inputted into the first manual operation controller 21, signals necessary for a manual operation mode selected by the manual-operation-mode selecting signal 31 are taken into the manual operation controller, and the controller operates in that selected operation mode.

In the first manual operation controller 21, the manual operation mode selector 21A switches into a manual mode selected by the inputted manual-operation-mode selecting signal 31 (i.e. switches into each of manual operation modes, including a jog-move controller 21B and a handle-move controller 21C); the controlling unit 21J for the respective manual operation controllers, such as the jog-move controller 21B and a handle-move controller 21C, outputs to an axis designated by the arbitrary-axis selection signal 32 a request to be manually operated; the manual operation controller performs manual operation at a move speed specified by the manual-move-speed instructing signal 33 and the like, in a predetermined manual mode; the manual operation controller outputs interpolated moving quantities to Axis controller 4 through 19 for the axes that have been designated by the arbitrary-axis selection signal 32, through a manual operation interpolation controller 21H, a manual operation axis selector 3A, and Axis Controller 3.

In FIG. 2, the axial move data 36 is data that specifies a position to which an axis is moved; the manual-arbitrary-move modal signal 37 is a signal for selecting either incremental-value instructions or absolute-value instructions, selecting move speeds, selecting either interpolation or non-interpolation, as well as selecting an acceleration/deceleration type. That is, when in the manual arbitrary move mode (the manual arbitrary move controller 21E is operating), using the axial move data 36, the controller determines a position to which the selected axis should be moved; using the manual-arbitrary-move modal signal 37, the controller determines, as instructions, which instructions should be used, incremental-value instructions or absolute-value instructions; the controller determines, as a move speed, which speed should be used, a fast-forwarding speed whose parameter has been set in advance, a manual-move-speed set by the manual-move-speed instructing signal 33, or a move speed instructed by the machining programs; moreover, the controller determines, as a way of moving, which should be used, interpolation move or non-interpolation move; the controller determines, as an acceleration/deceleration type, whether or not a regular acceleration/deceleration should be used.

Figure 3:
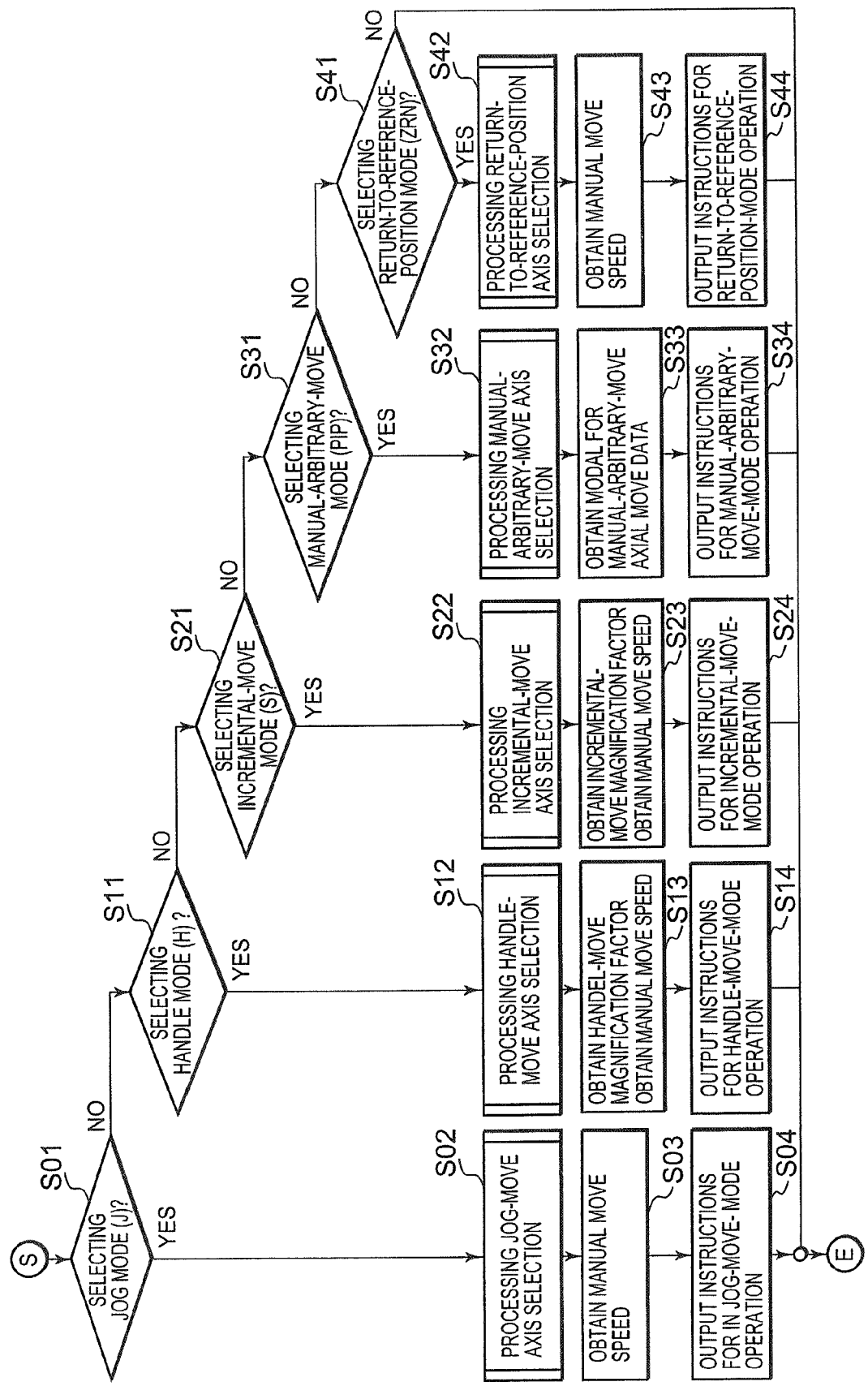
FIG. 3 is a flow chart for a manual operation mode selector of the numerical control apparatus in the embodiment according to the present invention.

FIG. 3 is a flow chart for a manual operation mode selector 21A in a manual operation controller 21 of the numerical control apparatus in the embodiment according to the present invention. The manual operation mode selector 22A in the manual operation controller 22 operates similarly to the manual operation mode selector 21A in the manual operation controller 21.

In the figure, according to the manual-operation-mode selecting signal 31 inputted into the manual operation controller 21 from the PLC controller 20, the selected manual operation mode is determined whether the mode is a jog-move mode, a handle-move mode, an incremental-move mode, a manual arbitrary move mode, or a return-to-referential-position mode by S01, S11, S21, S31, or S41, respectively.

That is, first, it is determined at S01 whether or not the jog-move mode has been selected. When it is determined at S01 that the jog-move mode has not been selected, S11 ensues, and then it is determined at S11 whether or not the handle-move mode has been selected. When it is determined at S11 that the handle-move mode has not been selected, S21 ensues, and then it is determined at S21 whether or not the incremental-move mode has been selected. When it is determined at S21 that the incremental-move mode has not been selected, S31 ensues, and it is determined at S31 whether or not the manual arbitrary move mode has been selected. When it is determined at S31 that the manual arbitrary move mode has not been selected, S41 ensues, it is determined at S41 whether or not the return-to-referential-position mode has been selected. When it is determined at S41 that the return-to-referential-position mode has not been selected, it is deemed that any of the modes has not been selected, so that the process ends.

When it is determined at S01 that the mode selection signal 31 for j g-move has been inputted, an axis is acquired for jog-move at S02 through the arbitrary-axis selection signal 32 and the arbitrary-axis selector 21G; a predetermined manual move speed is acquired at S03 from the manual-move-speed instructing signal 33; a request for jog-move operation mode is received at S04; finally, instructions for jog-move operation mode are outputted into the jog-move controller 21B; thereby, the jog-move controller 21B takes jog-move control, and outputs into the manual operation interpolation controller 21H its processing results.

Selected axes for jog-move, handle-move to be described later, incremental move, manual arbitrary move, and return-to-reference-position are acquired by the arbitrary-axis selection signal 32 and the arbitrary-axis selector 21G, detailed explanations of which will be made later using FIGS. 4 through 6.

When it is determined at S11 that the mode selection signal 31, for handle-move has been inputted, an axis for handle-move is acquired at S12 by the arbitrary-axis selection signal 32 and the arbitrary-axis selector 21G; a predetermined manual move speed is acquired at S13 from the manual-move-speed instructing signal 33, and a move-magnification factor for one handle pulse is acquired from the move-magnification factor signal 35; a request for handle-move operation mode is received at S14; finally, instructions for the handle-move operation mode are outputted into the handle-move controller 21C. Thereby, the handle-move controller 21C takes handle-move control and outputs into the manual operation interpolation controller 21H its processing results.

When it is determined at S21 that the mode selection signal 31 for incremental move has been inputted, an axis selected for incremental move is acquired at S22 by the arbitrary-axis selection signal 32 and the arbitrary-axis selector 21G; at S23, a predetermined manual move speed is acquired from the manual-move-speed instructing signal 33, and a move factor for one time incremental move is acquired from the move-magnification factor signal 35; a request for the incremental move operation mode is received at S24; finally, instructions for the incremental move operation mode are outputted into the incremental-move controller 21D. Thereby, the incremental-move controller 21D takes incremental move control and outputs into the manual operation interpolation controller 21H its processing results.

When it is determined at S31 that the mode selection signal 31 for manual arbitrary move has been inputted; an axis selected for manual arbitrary move is acquired at S32 by the arbitrary-axis selection signal 32 and the arbitrary-axis selector 21G; at S33, axial move data (the data specifies the position to which the selected axis should be moved) and modals are acquired from the axial move data 36 and from the manual-arbitrary-move modal signal 37, the modals in the manual arbitrary move (the modals, as described above, for determining which should be used as Instructions, incremental-value instructions or absolute-value ones, for determining which should be used, as a move speed, a fast-forward speed whose parameter has been set in advance, a manual move speed specified by the manual-move-speed instructing signal 33, or a move speed specified by the machining programs, for determining which should be used, as a way of move, interpolation move or non-interpolation move, and therefore, for determining, as an acceleration/deceleration type whether or not a regular acceleration/deceleration type should be used); a request for the manual arbitrary move operation mode is received at S34; finally, instructions for the manual arbitrary move operation mode are outputted into the manual arbitrary move controller 21E. Thereby, the manual arbitrary move controller 21E takes manual arbitrary move control and outputs into the manual operation interpolation controller 21H its processing results.

When it is determined at S41 that the mode selection signal 31 for return-to-referential-position has been inputted, an axis selected for return-to-referential-position is acquired at S42 by the arbitrary-axis selection signal 32 and the arbitrary-axis selector 21G; a move speed for return-to-referential-position operations is acquired at S43 from the manual-move-speed instructing signal 33; the request for return-to-referential-position mode is received at S44; finally, instructions for the return-to-referential-position mode are outputted into the return-to-referential-position controller 21F. Thereby, the return-to-referential-position controller 21F takes return-to-referential-position control and outputs into the manual operation interpolation controller 21H its processing results.

The manual operation mode selector 21A in the manual operation controller 21 operates as described above. Also, the manual operation mode selector 22A in the manual operation controller 22 operates similarly to the manual operation mode selector 21A in the manual operation controller 21.

Here, any axis for any one of the systems can be specified by the arbitrary-axis selection signal 32 in FIG. 2: this arbitrary-axis selection signal 32 includes an axis selection signal and an axis specifying signal.

Figure 4:
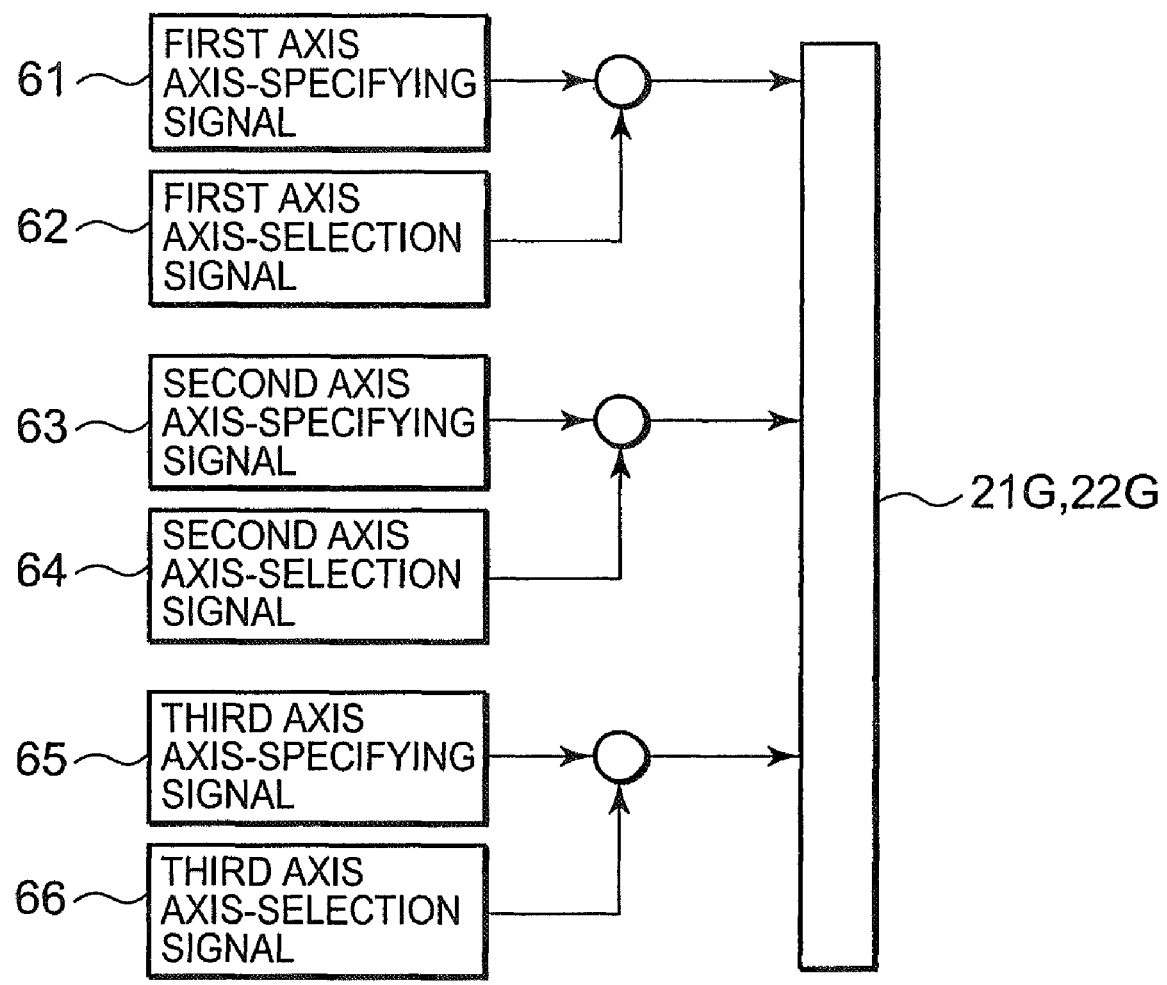
FIG. 4 is a diagram for explaining an arbitrary-axis selection signal in the numerical control apparatus in the embodiment according to the present invention.

FIG. 4 is a detailed diagram for the arbitrary-axis selection signal 32.

In FIG. 4, a first axis specifying signal 61, a second axis specifying signal 63, and a third axis specifying signal 65 that are included in the arbitrary-axis selection signal 32 determine each of axial numbers that have been assigned uniquely to all axes controllable in the systems; a first axis selection signal 62, a second axis selection signal 64, and a third axis selection signal 66 that are included in the arbitrary-axis selection signal 32 are signals (on/off signals) that determine whether or not the axes specified by the axis specifying signals 61, 63, and 65 are made effective. Also the arbitrary-axis selectors 21G and 22G select any axis across the systems according to these signals 61 through 66. Provision of the arbitrary-axis selection signal 32 described above enables any axis to be simply and easily selected.

Figure 5:
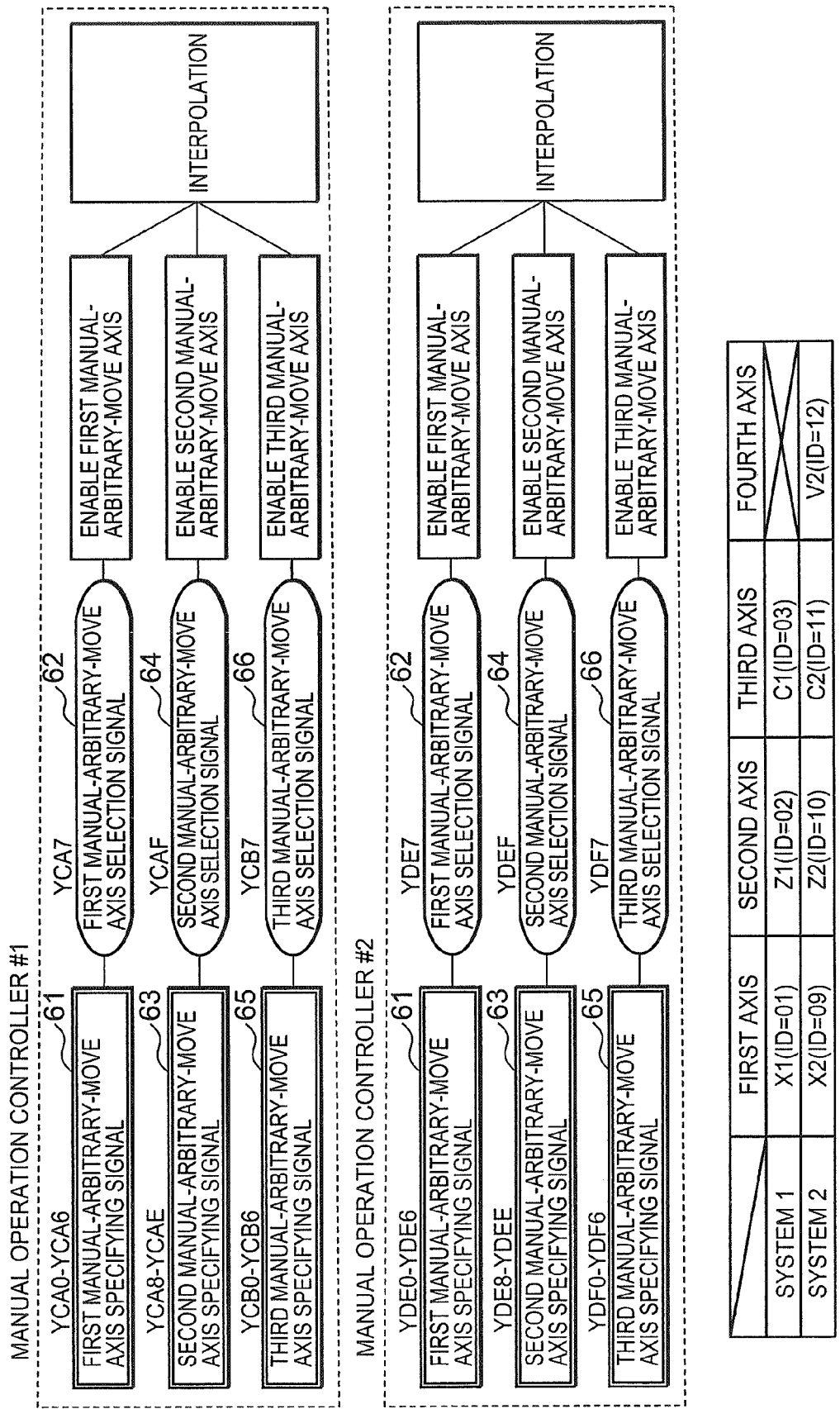
FIG. 5 are diagrams for explaining an arbitrary-axis selector of the numerical control apparatus in the embodiment according to the present invention.

FIG. 5 are diagrams, when specifying an axis to be moved arbitrarily in manual operation, for explaining in detail relations among the arbitrary-axis selection signal 32 and the arbitrary-axis selector 21G and 22G in FIGS. 1 through 2. Here, FIG. 5 are diagrams for explaining an example in which each of the manual operation controllers 21 and 22 can instruct simultaneously three axes.

Manual arbitrary move can be performed by configuring such a way that: axes to be actually operated are specified, using axis specifying signals, by the axial numbers each uniquely assigned to all control axes belonging to arbitrary systems, for each of maximum three axes that can be simultaneously interpolation-controlled; signals for selecting the first through the third axes whose axial numbers have been specified are inputted; and then, arbitrary three axes are specified among any axes of the arbitrary systems.

For example, when it is intended in FIG. 5 in to move simultaneously Axis X2 and Axis Z1 in a manual arbitrary mode by the first manual operation controller 21, and to move Axis V2 in a manual arbitrary mode by the second manual operation controller 22, '09' is assigned to a first axis specifying signal for manual arbitrary move at the first manual operation controller 21, and '02', to a second axis specifying signal for manual arbitrary move, and then, the first axis selection signal for manual arbitrary move and the second axis selection signal for manual move are activated. In addition, '12' is assigned to a first axis specifying signal for manual arbitrary move at the second manual operation controller 22, and then the first axis selection signal for manual move is activated. With above operations, the first manual operation controller 21 selects a first manual arbitrary moved-axis as Axis X2 whose ID is '09', and a second manual arbitrary moved-axis as Axis Z2 whose ID is '02', and no third manual arbitrary moved-axis is dealt with because of no axis to be selected; the second manual operation controller 22 selects a first manual arbitrary moved-axis as Axis V2 whose ID is '12', and but no second and third manual arbitrary moved-axes are dealt with because of no axis to be selected.

When an axis allocated is allocated to an M-th axis for an N-th system, for example, the ID number (axis specifying signal) of the axis is calculated by a formula of ((N−1)*8)+M. For example, in FIG. 5, the ID number for Axis Z1 allocated to the second axis for the first system is calculated: ((1−1)*8)+2=02; the ID number for Axis X2 allocated the first axis for the second system is calculated: ((2−1)*8)+1=09; the ID number for Axis V2 allocated to the fourth axis for the second system is calculated: ((2−1)*8)+4=12; each ID number is uniquely assigned.

Figure 6:
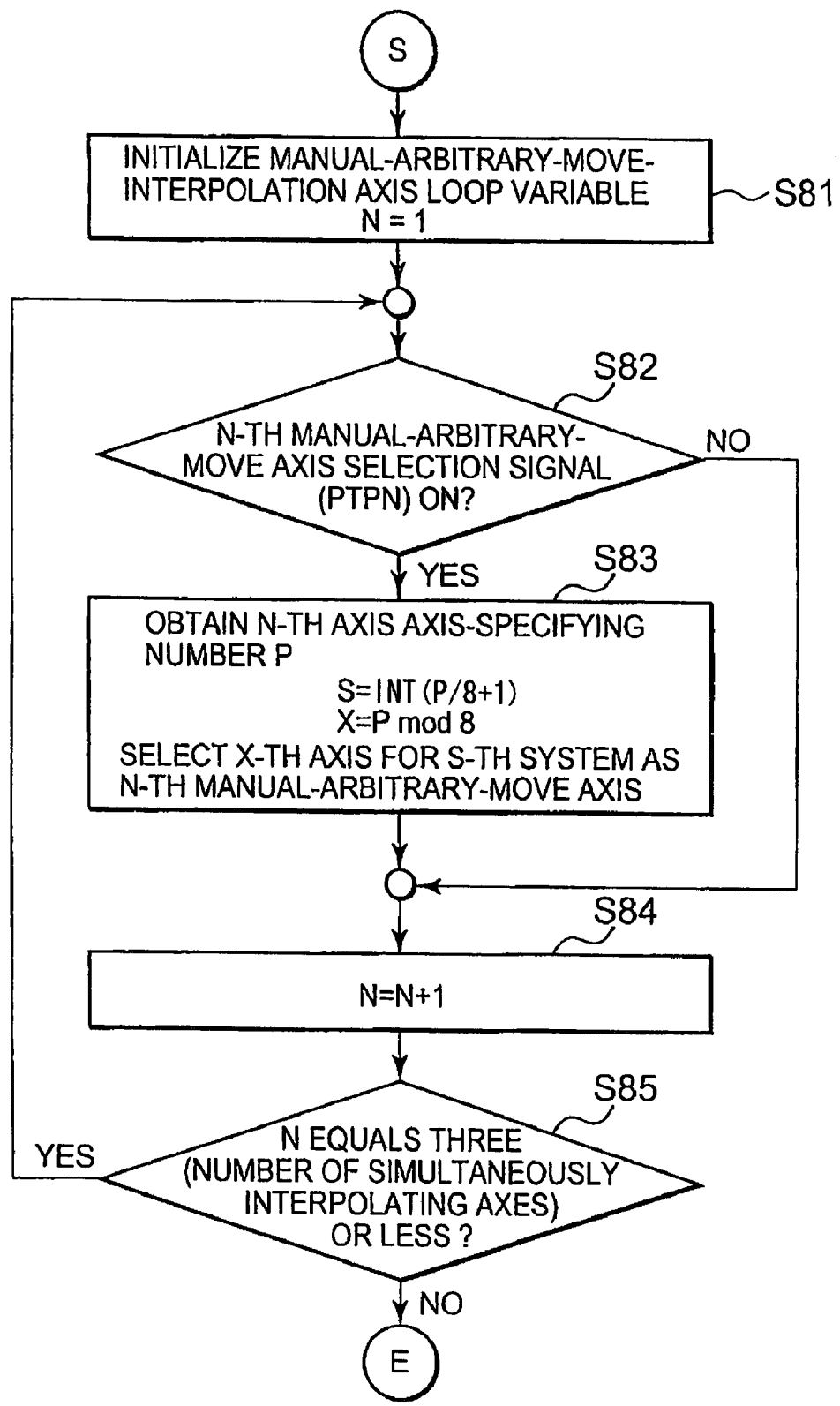
FIG. 6 is a flow chart for axis selection in the numerical control apparatus in the embodiment according to the present invention.

FIG. 6 is a flow chart regarding axis selection when the manual operation mode selectors 21 and 22, in the numerical control apparatus in the embodiment according to the present invention, operate in a manual arbitrary move mode.

As described above, the arbitrary-axis selection signal 32 includes axis specifying signals and axis selection signals whose numbers correspond to that of axes that can be simultaneously interpolation-controlled, for each of the manual operation controllers 21 and 22; first, at S81, a variable for manual-arbitrary-move-interpolation-control axis loop is initialized; next, at S82, the inputted status of an N-th axis selection signal (N is 1 through 3) for manual arbitrary move is checked; when the status is invalid (in the case of being off), S84 ensues. On the other hand, when the status is valid (in the case of being on), a system number of S and an axial number of X for the N-th axis (N is 1 through 3) to be interpolation-controlled by manual arbitrary move instructions are obtained at S83 from an N-th axis specifying number of P (N is 1 through 3) for manual arbitrary move. For example, when a first axis selection signal for manual arbitrary move is valid and a first axis specifying number for manual arbitrary move is '12', then calculations of S=INT(12/8)+1=2, and X=12 mod 8=4 are performed; thereby the fourth axis for the second system can be selected. In the above calculations, 'INT(12/8)' means that 12 divided by 8 gives a quotient of one and a remainder of four; therefore the remainder of four is ignored and the quotient of one is used. Meanwhile, in above calculations, '12 mod 8' means that 12 divided by 8 gives a quotient of one and a remainder of four, therefore the quotient of one is ignored and the remainder of four is used.

Next, at S84, the number for axis to be interpolation-controlled by manual arbitrary move is incremented (N=N+1); at S85, a judgment is made as to whether or not the N calculated above is less than or equal to the number of axes that can be simultaneously interpolation-controlled (in this case, the number is three); when the N is less than or equal to the number of axes that can be simultaneously interpolation-controlled, S82 through S85 are repeated. When the N becomes four at S85, the process ends because the N exceeds the number of axes that can be interpolation-controlled simultaneously.

Figure 7:
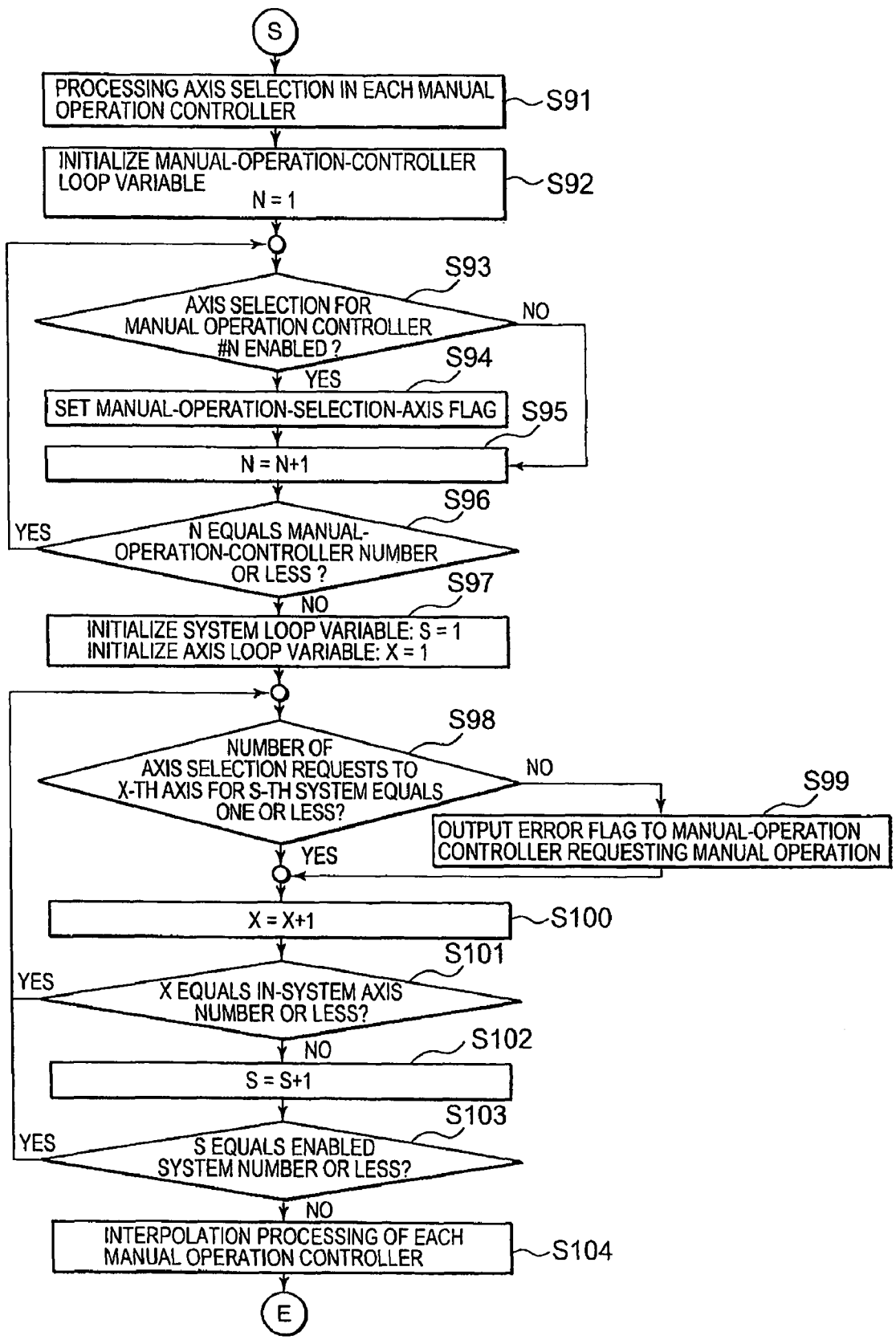
FIG. 7 is a flow chart by which the numerical control apparatus related to the embodiment according to the present invention determines whether or not operation of control axes selected to be manually operated is possible.

Also, in the numerical control apparatus in the embodiment according to the present invention, the manual operation axis selector 3A determines whether or not the control axes selected to be manually operated can be operated; FIG. 7 is a flow chart for explaining operations of the manual operation axis selector 3A (operations of judging whether or not the control axes selected to be manually operated can be operated).

In FIG. 7, the manual operation axis selector 3A operates after the manual operation controllers 21 and 22 have selected axes (S91); at S92, a loop variable for the manual operation controller is initialized (N=1). When axial selection in the N-th manual operation controller is invalid at S93 (when axes are not selected in the N-th manual operation controller), S95 ensues; on the other hand when axial selection in the N-th manual operation controller is valid (when axes are selected in the N-th manual operation controller), a manual-operation-selected-axis flag of the selected axis is set at S94. At S95, the loop variable for 2C the manual operation controller is incremented=N+1); at S96, loop operations are performed the same times as the number of the manual operation controllers. That is, when the N is less than or equal to the number of the manual operation controllers at S96, S93 through S96 are repeated; when the N exceeds the number of the manual operation controllers, S97 ensues.

After all the manual operation controllers have been processed, at S97, loop variables for systems and axes are initialized (S=1, X=1); judgment is made at S98 from the selected-axis flags set at S94 as to whether or not the number of axis selection requests from the manual operation controllers is less than or equal to one; when a plurality of requests from the manual operation controllers has been made, an error flag is outputted at S99 into the manual operation controller as a requesting source of the manual operation controller, and then manual operation error-halts. On the other hand, when the number of axis selection requests, which have been set as selected-axis flags at S94, from the manual operation controllers is less than or equal to one at S98, the system counter and the in-system axis counter are incremented and confirmations of status of requesting valid moving axes are made sequentially, by S100 through S103.

That is, adding at S100 one to the in-system axis counter (the number of axes) (X=X+1), then judgment is made at S101 as to whether or not the calculated number of axes (the in-system-axis counter value) is less than or equal to the number of axes for the system. When the calculated number of axes is less than or equal to the number of axes for the system at S101, process flow returns to S98 and repeats operations of above-described S98 through S101. On the other hand, when the calculated number of axes exceeds at S101 the number of axes for the system, S102 ensues, one is added at S102 to the system counter (the counted number of systems) (S=S+1); when the calculated number of systems (the counted number of systems) is less than or equal to the number of valid systems at S103, S98 ensues, and above-described operations of S98 through S103 are repeated. Also, when the calculated number of systems (the counted number of systems) exceeds at S103 the number of valid systems, S104 ensues, and then each of the manual operation controllers performs interpolation process.

Figure 8:
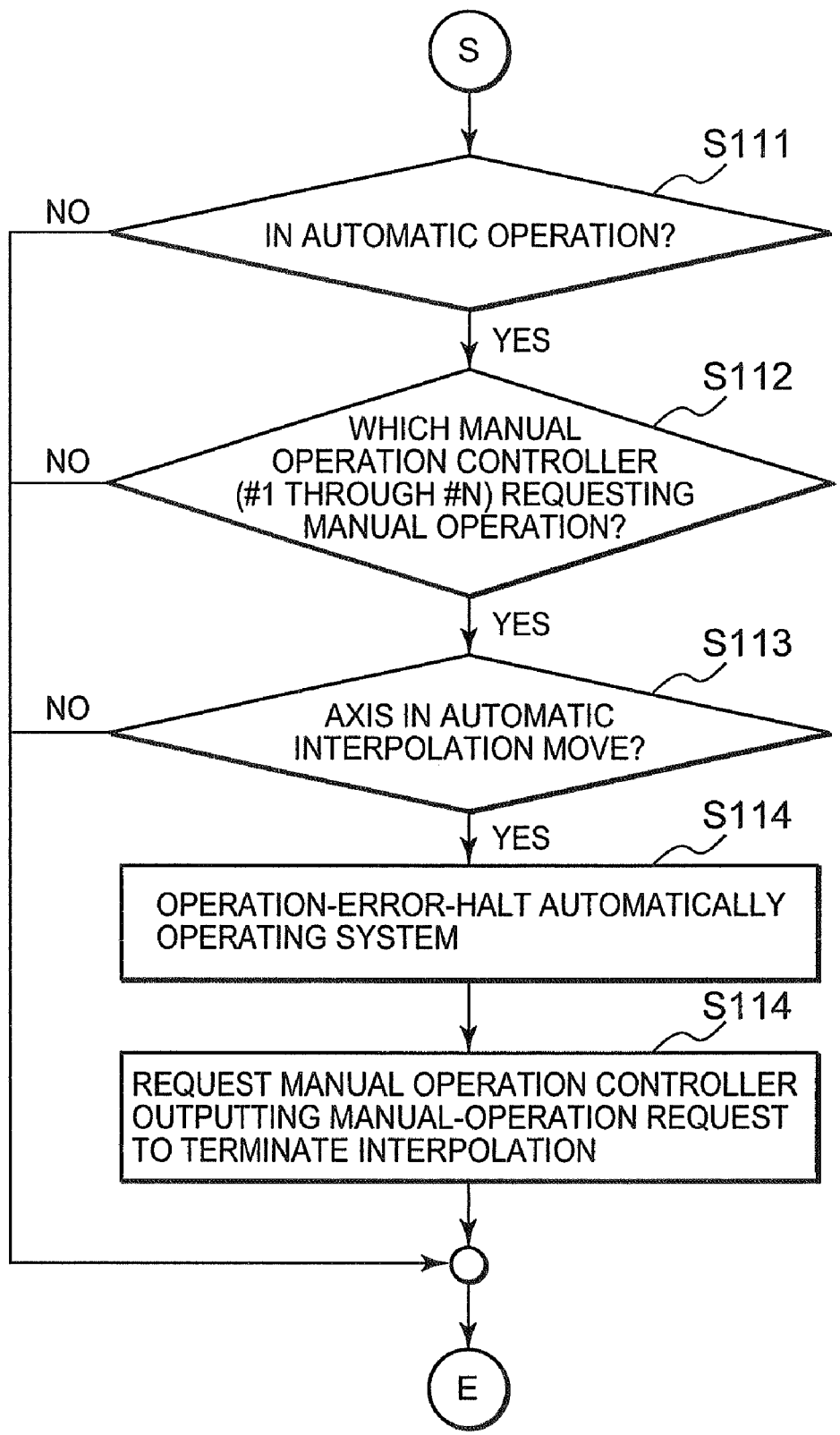
FIG. 8 is a flow chart by which error is checked in an interpolation process of an automatic operation controller of the numerical control apparatus related to the embodiment according to the present invention, when axes instructed of automatic-operation interpolation are selected erroneously as those of manual operation.

Also, in the numerical control apparatus in the embodiment according to the present invention, the manual operation axis selector 3A handles errors when a request for manual operation is made to an axis in automatic interpolation move; FIG. 8 is a flow chart for explaining operations (during error handling) of the manual operation axis selector 3A.

In FIG. 8, it is judged at S111 on the basis of signals outputted from the automatic operation interpolation controllers 1F and 2F whether or not the automatic operation controllers 1 and 2 for the respective systems are in manual operation; when they are not in manual operation, process flow ends; when they are in manual operation, S112 ensues. The manual operation axis selector determines at S112 whether or not manual operation is requested from any of the manual operation controllers, on the basis of signals outputted from the manual operation interpolation controllers 21H and 22H; when manual operation is not requested, process flow ends; when manual operation is requested, S113 ensues. The manual operation axis selector determines at S113 whether or not the axis is in interpolation move by automatic operation; when the axis is not an axis in interpolation move, process flow ends; when the axis is in interpolation move, S114 ensues. At S114, the system that is being operating the requested axis in automatic operation is operation-error-halted; at S115, a request is issued to terminate manual interpolation of the manual operation controller that is requesting manual operation of an error axis. The manual operation interpolation controller that has received the request to terminate manual interpolation immediately halts the interpolation in manual operation.

The manual operation controllers that are not in error on the flow charts of FIG. 7 and FIG. 8, perform manual operations according to selected manual operation modes, by outputting positional data interpolated for manual operation, via Axis Controller 3, into Axis Controller 4 through 16 corresponding to the instructed axes.

As has been explained above, the numerical control apparatus according to this embodiment is provided with the arbitrary-axis selection signal 32 so that any axis can be specified as a manual operation control axis for each of the manual operation controllers 21 and 22; also the numerical control apparatus is provided with the manual operation axis selector 3A, in which the axis selector confirms that the specified axes that have been selected, by the manual operation controllers 21 and 22, so as to be in manual operation mode are not simultaneously instructed by either of the manual operation controller 21 or 22, as well as confirms automatic operation status of the systems to which the instructed axes belong, and moving status of the axes in order to determine whether or not manual operation instructions can be issued; therefore, irrespective of axis configuration of each system and axis status in which axes are exchanged among automatically operated systems, axes that belong to any system can be freely selected from any one of the numerical operation controller, and a plurality of axes for arbitrary systems are combined so that interpolation move in manual operation can be performed.

Also, in a machine tool configured to perform machining with axes being exchanged among systems, even when the machine tool alarm-halts with the axes being exchanged among the systems, axes instructed to operate manually can be selected with axis combination at the instant of the alarm-halt, which bring effects in that the machine tool can easily recover from halt positions.

Moreover, because the machine tool can select axes instructed to manually operate, by combining a plurality of axes belonging to arbitrary systems, when any one of instructed axes error-halts, the machine tool can simultaneously halt movement of other axes that is being interpolated in the same manual operation, which brings effects in that manual operations can be performed safely with axes to be moved simultaneously being freely combined with those of the arbitrary systems.

In addition, for each of the manual operation controllers 21 and 22, any axis belonging to the arbitrary systems can be selected as an axis to be instructed to manually operate and operational conditions such as move speed can be specified, therefore, a plurality of axes that belongs to the same system can be selected independently of different manual operation controllers 21 and 22, which brings effects in that each of the axes can be manually operated in each manual operation mode. Also, because axes that are manually operated different from each other can be allocated to the same system, the number of controllable systems of a numerical control apparatus can be reduced; therefore the numerical control apparatus does not need sophisticated CPUs, leading to low cost manufacturing.

Furthermore, each of the manual operation controllers further includes manual operation reset signals 34 and 38, aside from the NC-reset signals 26 and 27 that reset each system's operation, so that the NC-reset signals provided for each of the systems do not reset its manual operation; when peripheral axes for a machine tool are operated in a manual mode in an auxiliary manner during automatic operation, the manual operation can continue without halt even when an NC-reset signal is inputted due to reset instructions given by a program. Moreover, because each of the manual operation controllers is provided with its own manual operation reset signal, only the operations of the peripheral axes for the machine tool can be halted without halting the programs that are performing automatic operation.

Figure 9:
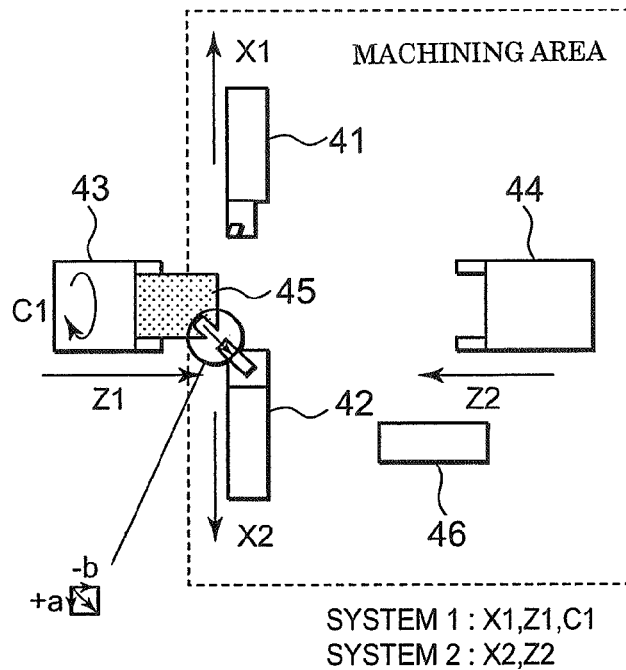
FIG. 9 is a view for explaining a configurational example of a machine tool controlled by the numerical control apparatus related to the embodiment according to the present invention, and effects brought by that embodiment.

FIG. 9 is an explanatory view for explaining an embodiment of a machine tool controlled by the numerical control apparatus described above as well as effects of the embodiment described above.

Control axes of the numerical control apparatus in the figure are configured such that a first axis, a second axis and a third axis that are included in a first system 1 correspond to Axis X1, Axis Z1, and Axis C1 respectively and a first axis and a second axis that are included in a system correspond to Axis X2 and Axis Z2, respectively. The machine tool to be controlled includes a first tool slide 41, a second tool slide 42, a first spindle head 43, a second spindle head 44, and a product tray 46. The system 1 includes the first tool slide 41 and the first spindle head 43, and the system 2 includes the second tool slide 42 and the second spindle head 44. A workpiece 45 is held at the first spindle head 43 and turned or positioned by Axis C1. The tool slide 41 is driven by Axis X1 that is moved radially with respect to the workpiece 45 and the workpiece 45 is machined by taking interpolation control of Axis X1, Axis Z1, and Axis C1. Also, the tool slide 42 is driven by Axis X2 that is moved radially with respect to the workpiece 45; after a machining program exchanges Axis X1 for Axis X2 between the system 1 and the system 2, the workpiece 45 is machined by taking interpolation control of Axis X2, Axis Z1, and Axis C1 according to a machining program in the system 1.

The spindle head 44 is driven by Axis Z2 that is moved parallel to Axis Z1; when the tool slide 41 or the tool slide finishes machining, the spindle head is moved forward, holds the workpiece 45, is moved backward, and releases the workpiece at a product tray, allowing machined products to be delivered.

In a numerical control machine tool configured as above, for example, it is assumed that, while the second tool slide 42 is drilling obliquely, by taking interpolation control of Axis X2 and Axis Z1, a hole into the workpiece 45 toward its hole-bottom positioned at −a along Axis X2 and at +b along Axis Z1 with respect to the drilling start position, the drilling operation alarm-halts due to a heavy load. At this moment, because the tool just drilling the hole is on the way along the vector (−a, +b) originating from the drilling start position, the tool stops as biting into the workpiece; therefore, it is necessary that the tool should be moved along the vector of (+a, −b), in the reverse direction in which Axis X2 and Axis Z1 have been interpolation-controlled to move.

At this moment, a signal that selects the manual arbitrary move mode is inputted, as a manual-operation-mode selecting signal 31, into the manual operation controller 21 (or the manual operation controller 22), and signals that specify Axis X2 for the system 2 and Axis Z1 for the system 1 are also inputted as the arbitrary-axis selection signals 32. Furthermore, as axial move data 36, instructions are issued so that the axes incrementally move from the alarm-halt position by the distances of +a and −b, respectively; the manual-arbitrary-move modal signals 37 are inputted as well.

Then, as a result, Axis X2 for the system 2 and Axis Z1 for the system 1 can be manually interpolation-controlled from the halt position in the direction reverse to that of drilling.

According to this embodiment, the machine tool can select axes for manual operation by combining a plurality of axes belonging to arbitrary systems, and can position the axes by combining any axes for the arbitrary systems and manually taking interpolation control in a direction that signals specify in coordinates; therefore, troubles that occur during machining operations with combination of axes each belonging to different systems can be got rid of manually and safely.

Figure 10:
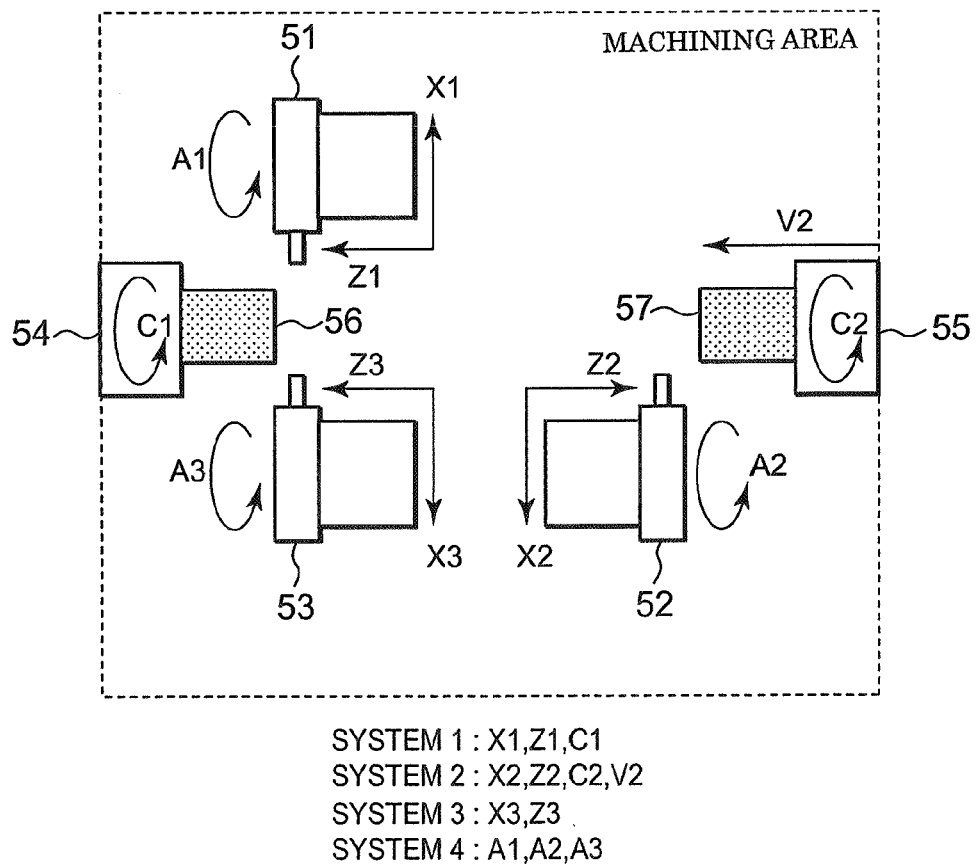
FIG. 10 is another view for explaining a configurational example of a machine tool controlled by the numerical control apparatus related to the embodiment according to the present invention, and effects brought by that embodiment.
Figure 11:
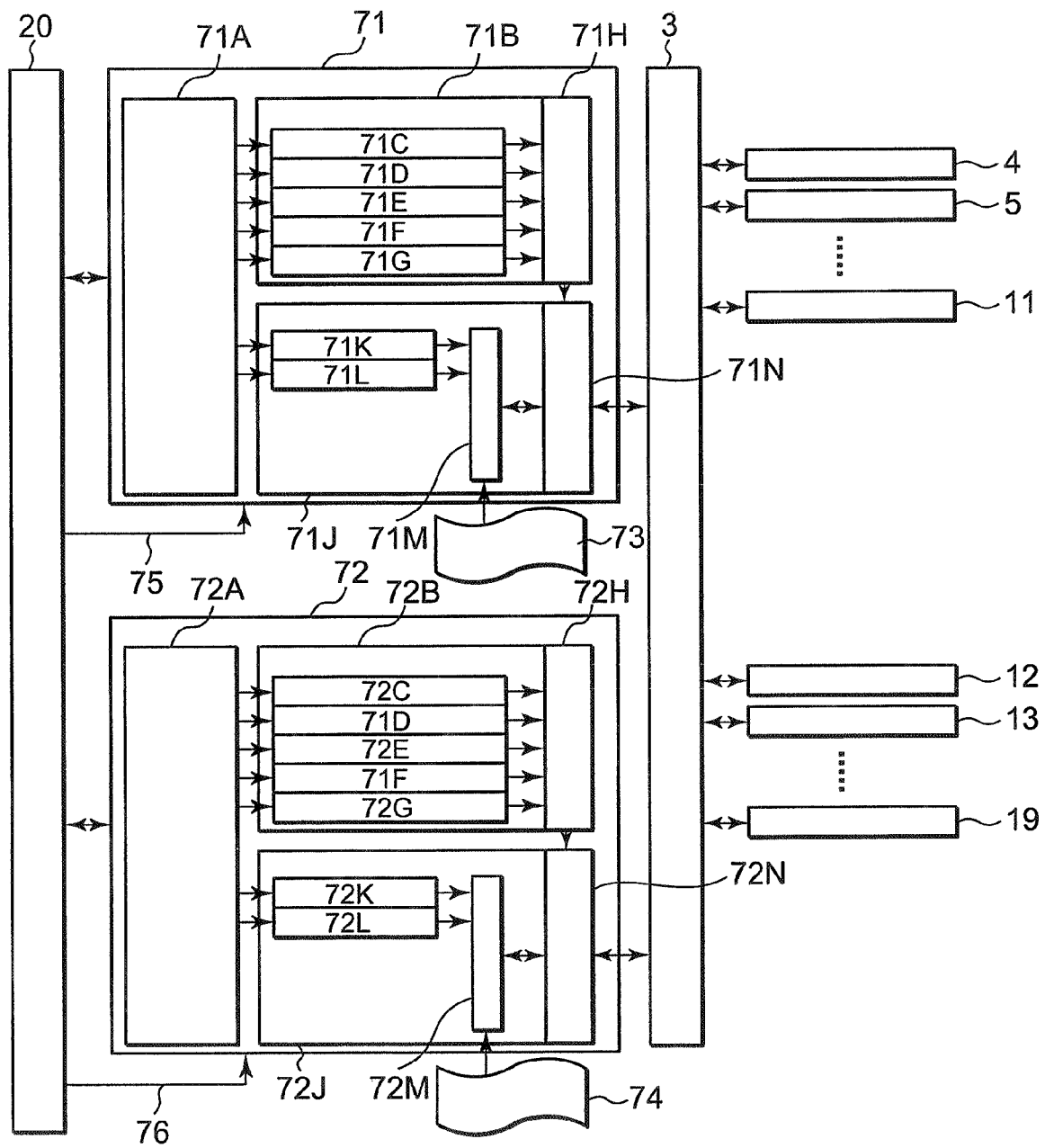
FIG. 11 is a block diagram illustrating essential parts of a conventional numerical control apparatus.
Figure 12:
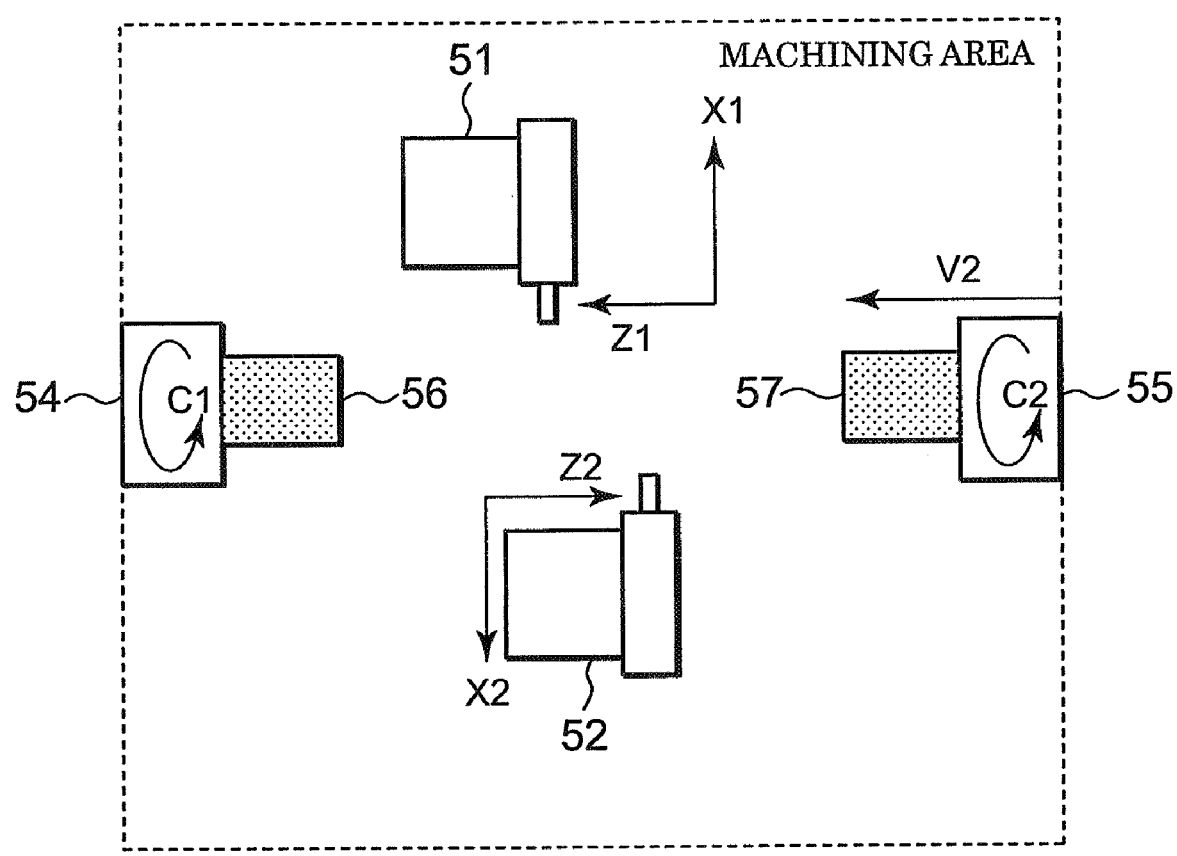
FIG. 12 is an explanatory view for a configurational example of a machine tool controlled by the conventional numerical control apparatus.

FIG. 10 is an explanatory view for explaining in detail configuration of a machine tool, along with effects of the machine tool, that is controlled by a numerical control apparatus in which two more system controllers are added to the numerical control apparatus explained in FIG. 1, so as to configure a four-system numerical control apparatus, and another manual operation controller is also added thereto (also, a reset signal for manual operation is added).

In the figure, control axes of the numerical control apparatus are configured such that a first axis, a second axis and a third axis for a system 1 correspond to Axis X1, Axis Z1, and Axis C1, respectively; a first axis, a second axis, a third axis, and a fourth axis for a system 2 correspond to Axis X2, Axis Z2, Axis C2, and Axis V2, respectively; a first axis and a second axis for a system 3 correspond to Axis X3 and Axis Z3; and a first axis, a second axis and a third axis for a system 4 correspond to Axis A1, Axis A2, and Axis A3, respectively. The machine tool to be controlled includes a first turret 51, a second turret 52, a third turret 53, a first spindle head 54, and a second spindle head 55.

The system 1 includes the first turret 51 and the first spindle head 54, the system 2, the second turret 52 and the second spindle head 55, the system 3, the third turret. The system 4 includes Axis A1, Axis A2, and Axis A3 that position stations for the first turret through the third turret according to tool selection instructions from the systems 1 through 3, respectively. A workpiece 56 is held at the first spindle head 54 and turned or positioned by Axis C1. The first turret 51 is driven by Axis X1 and Axis Z1, and the workpiece 56 is machined by taking interpolation control of Axis X1, Axis Z1, and Axis C1. Also, the second turret 52 is driven by Axis X2 and Axis Z2, the second spindle head 55 is moved back/forth toward the first spindle head, and the workpiece 57 being held is turned or positioned by Axis C2. The third turret 53 is driven by Axis X3 and Axis Z3; after the machining program has exchanged Axis C1 for the system 1 for an axis for the system 3, the workpiece 56 is machined according to a machining program in the system 3, by taking interpolation control of Axis X3, Axis Z3, and Axis C1. When the spindle head 54 finishes machining, the spindle head 55 is moved forward, holds the workpiece 56, and is moved backward; the second turret 52 machines the back side of the workpiece as re-held thereby.

In a numerical control machine tool configured above, when tool selection instructions are issued in the system 1, Axis A1 for the system 4 is turned and positioned in a station where an instructed tool is allocated, in order to change tools into predetermined ones in the first turret 51. Also, when tool selection instructions are issued in the system 2, Axis A2 for the system 4 is turned and positioned in a station where an instruction tool is allocated, in order to change tools into predetermined ones in the second turret 52. Also, when tool selection instructions are issued in the system 3, Axis A3 for the system 4 is turned and positioned in a station where an instructed tool is allocated, in order to change tools to predetermined ones in the third turret 53. At this moment, instructions of selecting tools are issued independently according to each of the programs in the systems. Therefore, when the first manual operation controller, the second manual operation controller, and the third manual operation controller are assigned so as to operate manually the first axis (Axis A1) in the system 4, the second axis (Axis A2) in the system 4, and the third axis (Axis A3) in the system 4, respectively, and tool selection instructions from the PLC are issued to the first system, the second system, and the third system, positioning of Axis A1, Axis A2, and Axis A3, is performed in each predetermined tool-position, respectively. Here, because Axis A1, Axis A2, and Axis A3 are positioned by the manual operation controllers each independent of the others, each feed rate can be independently specified according to each mechanical structure.

Also when peripheral control, such as determining positions of turrets for Axis A1, Axis A2, and Axis A3, is taken, predetermined turrets are positioned in the specified stations by manual operation mode according to instructions from programs performing automatic operation. Even when NC-reset signals (signals 26 or 27 in FIG. 1) are inputted into automatically operating systems during these positioning operations, Axis A1, Axis A2, and Axis A3 that are being manually operated do not halt, but halt only when the manual operation reset signals (the manual operation reset signals and 38 in FIG. 1, and those equivalent to them) are inputted.

According to this embodiment, the axes controlling peripherals of the machine tool can be included in a predetermined system so as to be manually operated independently of each other; therefore, the total number of systems that control the whole machine tool can be reduced, bringing an effect in that a numerical control apparatus can be provided at low cost. In a machine tool configured as FIG. 10, Axis A1, Axis A2, and Axis A3 should be independently controlled in order to control turrets in the systems 1 through 3. Therefore, a conventional numerical control apparatus needs, in addition to its main three systems, systems to each of which Axis A1, Axis A2, and Axis A3 are allocated, so that a numerical control apparatus capable of controlling six systems becomes necessary; however, a numerical control apparatus according to the present invention can control with one more system, in addition to the main three systems, to which all of Axis A1, Axis A2, and Axis A3 are allocated together, that is, a numerical control apparatus provided with four systems can realize entire controlling, bringing effects in that an apparatus does not need sophisticated CPUs and can be provided at low cost.

Also, according to this embodiment, when any of Axis A1, Axis A2, and Axis A3 that are allocated to the same system over-moves, for example, each axis is controlled by an independent manual operation controller; therefore even if any one of the axes for the same system falls into an error by manual operation instructions, only the error axis for the same system is halted in such a way that the manual operation controllers operating manually the error axis are instructed to halt the relevant axis, so that the error does not affect other axes in the manual operation. Therefore, it becomes possible to safely perform manual operation in which axes for the arbitrary systems are combined to move simultaneously.

Also, in this embodiment, for example, when an automatically operating system starts manual operation of Axis A1, Axis A2, and Axis A3, even if the automatically operated system is halted by an NC-reset signal, the reset signal does not affect operations of peripheral axes associated with Axis A1, Axis A2, Axis A3 and the like, the peripheral axes' operations can be made not to terminate during their operations by programs erroneously coded by machine operators.

Embodiment 2

Using the embodiment illustrated in FIG. 1, it has been explained that the apparatus can freely select axes belonging to arbitrary systems, from any one of manual operation controllers, irrespective of axis configuration and axis status in which axes are exchanged among manually operated systems, and can combine a plurality of axes of any arbitrary systems so that interpolation in manual operation is enabled; also, in a machine tool that is configured to perform machining while axes are being exchanged among systems, the manual operation controllers 21 and 22 can take interpolation control of each of the axes across the systems so that recovery from the halt positions can easily be made, even when the machine tool alarm-halts with the axes being exchanged among the systems, by selecting axes instructed to operate manually from the combination of axes at the instant of the alarm-halt. However, even if the manual operation controllers 21 and 22 are configured to control each axis across the systems one by one, instead of taking interpolation control of axes across the systems, the expected aims (to manually operate desired axes in predetermined manual operation mode, irrespective of axis configuration of each of the systems and axis status in which axes are exchanged among the manually operating systems) may be achieved.

In the embodiment above, it has been explained that an apparatus is provided with two manual operation controllers; however even when only one manual operation controller is provided, the apparatus can freely select axes belonging to arbitrary systems, from any one of manual operation controllers, irrespective of axis configuration of each of the systems and axis status in which axes are exchanged among manually operated systems, and can combine a plurality of axes of the arbitrary systems so that interpolation in manual operation is enabled; while axes are being exchanged among the systems, the machine tool that is configured to perform machining also can easily recover from the halt positions, even when the machine tool alarm-halts with the axes being exchanged among the systems, by selecting as axes instructed to operate manually from the combination of axes at the instant of the alarm-halt.

Also, the embodiment in FIG. 1 exemplifies a numerical apparatus that has two systems; therefore two system controllers are provided; however, when a numerical control apparatus includes three systems, three system controllers may be provided; when four systems, four system controllers.

Furthermore, two manual operation controllers described above are included; however the manual operation controllers do not need to be provided as many as the number of systems in the numerical control apparatus; the controllers may be provided in accordance with number of the Systems that need to be manually operated independently and simultaneously.

INDUSTRIAL APPLICABILITY

A numerical control apparatus according to the present invention is suitably applicable to numerical control machine, tools that include two or more systems to be controlled, especially to the ones in which the machine tool includes axes controlling peripheral devices for the machine tool and each of the peripheral axes is manually operated by each of the systems.

What is claimed is:

1. A numerical control apparatus for controlling a plurality of systems, comprising:
    a PLC controller;
    a plurality of automatic operation controllers provided for each of a plurality of systems, said each system has assigned, fixed control axes that are automatically operated, where the plurality of automatic operation controllers automatically operate the control axes for the plurality of systems based on signals from the PLC controller;
    a plurality of manual operation controllers which manually operate, based on the signals from the PLC controller, any axes of the assigned, fixed control axes irrespective of at least one system to which the axes are assigned;
    a manual operation axis selector which determines whether or not axes selected through the manual operation controllers can be manually operated; and
    an axis controller which controls the assigned, fixed control axes that the manual operation axis selector determines can be manually operated,
    wherein each of the plurality of manual operation controllers comprises:
        a manual operation mode selector which selects, based on a manual-operation-mode selecting signal output from the PLC controller, one of operation modes;
    a manual operation mode controller which performs control using the selected operation mode, based on an arbitrary-axis selection signal output from the PLC controller, indicating axes that are to be manually operated that includes any axes of the assigned, fixed control axes, and based on predetermined signals output from the PLC controller, specifying operating conditions comprising feed speed; and
    a manual operation interpolation controller which performs interpolation control of the axes manually operated by the manual operation mode controller.

2. A numerical control apparatus according to claim 1, wherein the manual operation axis selector determines whether the axes that have been selected by the manual operation controllers can manually be operated, based on whether each of the axes is not instructed simultaneously from any of the manual operation controllers, on automatic operation status of the systems that the instructed axes belong to, and on moving status of the axes.

3. A numerical control apparatus according to claim 2, wherein the PLC controller outputs to each of the automatic operation controllers an automatic operation reset signal, and outputs to each of the manual operation controllers a manual operation reset signal.

4. A numerical control apparatus according to claim 1, wherein the arbitrary-axis selection signal comprises an axis specifying signal for specifying one of axial numbers that are assigned uniquely to all of the controllable axes for the systems, and an axis selection signal for determining whether or not an axis specified by the axis specifying signal is valid.

5. A numerical control apparatus according to claim 4, wherein the PLC controller outputs to each of the automatic operation controllers an automatic operation reset signal, and outputs to each of the manual operation controllers a manual operation reset signal.

6. A numerical control apparatus according to claim 1, wherein the PLC controller outputs to each of the automatic operation controllers an automatic operation reset signal, and outputs to each of the manual operation controllers a manual operation reset signal.

7. A numeric control apparatus according to claim 1, wherein the operation modes comprise: a jog-move mode, a handle-move, an incremental-move modes, a manual arbitrary move mode, and a return-to-referential-position mode.

8. A numeric control apparatus according to claim 1, wherein the plurality of systems are implemented within a unit of hardware and each is controlled by a machining program and control signals that are independent of machining programs and control signals for other system from the plurality of systems, and wherein each of the plurality of systems machines at least one product different from a product machined by the other systems.

9. A numeric control apparatus according to claim 8, wherein a respective automatic operation controller from the plurality of the automatic operation controllers is provided for each system from the plurality of systems and wherein a number of the plurality of manual operation controllers is independent of a number of the plurality of systems.

10. A numeric control apparatus according to claim 1, wherein a manual operation controller manually operates a plurality of axes simultaneously selected from different systems of the plurality of systems.

11. A numeric control apparatus according to claim 1, wherein a separate reset signal is provided for each controller.

12. A numeric control apparatus according to claim 1, wherein the manual operation controller comprises user interface elements designating various move operations.

13. A numeric control apparatus according to claim 1, wherein each of the plurality of systems comprises a respective system controller, wherein the respective system controller comprises an automatic mode selector and one respective automatic operation controllers from the plurality of automatic operation controllers and wherein each of the plurality of manual operation controllers are independent of the plurality of systems and system controllers and comprise manual operation mode selectors and the operating conditions selector.

14. A numerical control machine tool comprising:
    a spindle;
    a plurality of tool slides; and
    a numerical control apparatus for controlling a plurality of systems, comprising:
        a PLC controller;
        a plurality of automatic operation controllers provided for each of a plurality of systems, said each system has assigned, fixed control axes that are automatically operated, where the plurality of automatic operation controllers automatically operate the control axes for the plurality of systems based on signals from the PLC controller;

a plurality of manual operation controllers which manually operate, based on the signals from the PLC controller, any axes of the assigned, fixed control axes irrespective of at least one system to which the axes are assigned;

a manual operation axis selector which determines whether or not axes selected through the manual operation controllers can be manually operated; and an axis controller which controls the assigned, fixed control axes that the manual operation axis selector determines can be manually operated, wherein each of the plurality of manual operation controllers comprises:

a manual operation mode selector which selects, based on a manual-operation-mode selecting signal output from the PLC controller, one of operation modes;

a manual operation mode controller which performs control using the selected operation mode, based on an arbitrary-axes selection signal output from the PLC controller, indicating axes that are to be manually operated that includes any axes of the assigned, fixed control axes, and based on predetermined signals output from the PLC controller, specifying operating conditions comprising feed speed; and a manual operation interpolation controller which performs interpolation control of the axes manually operated by the manual operation mode controller.

15. A numerical control machine tool according to claim 14, wherein the manual operation axis selector determines whether the axes that have been selected by the manual operation controllers can manually be operated, based on whether each of the axes is not instructed simultaneously from any of the manual operation controllers, on automatic operation status of the systems that the instructed axes belong to, and on moving status of the axes.

16. A numerical control machine tool according to claim 15, wherein the PLC controller outputs to each of the automatic operation controllers an automatic operation reset signal, and outputs to each of the manual operation controllers a manual operation reset signal.

17. A numerical control machine tool according to claim 14, wherein the arbitrary-axis selection signal comprises an axis specifying signal for specifying one of axial numbers that are assigned uniquely to the controllable axes of the systems, and an axis selection signal for determining whether or not an axis specified by the axis specifying signal is valid.

18. A numerical control machine tool according to claim 17, wherein the PLC controller outputs to each of the automatic operation controllers an automatic operation reset signal, and outputs to each of the manual operation controllers a manual operation reset signal.

19. A numerical control machine tool according to claim 14, wherein the PLC controller outputs to each of the automatic operation controllers an automatic operation reset signal, and outputs to each of the manual operation controllers a manual operation reset signal.

20. A system for controlling a plurality of machining tools where the plurality of tools form a plurality of machining equipment units such that each of the plurality of tools is present in a single machining equipment unit of the plurality of machining equipment units and each of the plurality of machining equipment units is assigned a fixed control axes different from control axes of other machining equipment units from the plurality of machining equipment units, the system comprising:

a selector which is manipulated by an operator selecting an automatic operation mode, for one of the plurality of machining equipment units, executed by a respective automatic operation controller from a plurality of automatic operation controllers;

a selector which is manipulated by the operator selecting a manual operation mode executed by at least one manual operation controller;

the plurality of automatic operation controllers, provided for each of the plurality of machining equipment units, which automatically control fixed control axes of a respective machining equipment unit and automatically perform machining based on a stored program; and the at least one manual operation controller which manually controls portions of fixed control axes from different equipment units forming an arbitrary virtual equipment unit with a virtual control axes and automatically performs machining using the arbitrary virtual equipment unit.

* * * * *